United States Patent
Numata et al.

(10) Patent No.: US 10,173,345 B2
(45) Date of Patent: Jan. 8, 2019

(54) DUST COLLECTION COVER FOR CUTTING DEVICES

(71) Applicant: MAKITA CORPORATION, Anjo-shi, Aichi (JP)

(72) Inventors: Fumitoshi Numata, Anjo (JP); Akihiro Goto, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 70 days.

(21) Appl. No.: 15/176,479

(22) Filed: Jun. 8, 2016

(65) Prior Publication Data
US 2016/0368166 A1 Dec. 22, 2016

(30) Foreign Application Priority Data

Jun. 18, 2015 (JP) .................... 2015-123194
May 20, 2016 (JP) .................... 2016-101389

(51) Int. Cl.
*B28D 7/02* (2006.01)
*B23D 59/00* (2006.01)
*B23D 45/16* (2006.01)
*B28D 1/04* (2006.01)

(52) U.S. Cl.
CPC ............ *B28D 7/02* (2013.01); *B23D 45/16* (2013.01); *B23D 59/006* (2013.01); *B28D 1/045* (2013.01)

(58) Field of Classification Search
CPC ........ B28D 7/02; B28D 1/045; B23D 59/006; B23D 45/16
USPC .................................... 30/390–391
See application file for complete search history.

(56) References Cited

U.S. PATENT DOCUMENTS

| 5,570,511 | A | * | 11/1996 | Reich | ........... | B27B 9/02 |
| | | | | | | 30/376 |
| 8,037,610 | B2 | * | 10/2011 | Chambers | ........... | B23D 59/006 |
| | | | | | | 30/124 |
| 2008/0244910 | A1 | | 10/2008 | Patel | | |
| 2010/0043768 | A1 | * | 2/2010 | Yokota | ........... | B23D 59/006 |
| | | | | | | 125/13.01 |

FOREIGN PATENT DOCUMENTS

JP 2007-030314 A 2/2007

* cited by examiner

*Primary Examiner* — Ghassem Alie
*Assistant Examiner* — Nhat Chieu Do
(74) *Attorney, Agent, or Firm* — Oliff PLC

(57) ABSTRACT

A separation lock member is provided in a main body cover. When a fixing cover is rotated with respect to the main body cover at a predetermined opening/closing angle (opening angle $\theta_1$) and then an unlock operation of the separation lock member is performed, a rotation support shaft can be separated from a support groove 23a, such that the main body cover can be separated from the fixing cover.

11 Claims, 26 Drawing Sheets

DUST COLLECTION COVER FOR CUTTING DEVICES

CROSS-REFERENCE

This application claims priority to Japanese patent application serial number 2015-123194, filed on Jun. 18, 2015, the contents of which are incorporated herein by reference in its entirely.

TECHNICAL FIELD

The present invention generally relates to a dust collection cover (a dust collector) of a cutting device (a cutter) used for, for example, cutting and/or grooving a stone material or a concrete block, or cutting an asphalt road surface.

BACKGROUND ART

During cutting operations discussed above, a large amount of dusts and/or debris may be generated from cutting area. In order to satisfactorily maintain a working environment, it is necessary to prevent the generated dusts and/or debris from being scattered around. Owing to this, during the cutting operations, a dust collection cover (a dust collector) is attached to a cutting device. A technique relating to the dust collection cover (dust collector) is disclosed in the following patent documents.

Japanese Laid-Open Patent Publication No. 2007-30314 discloses a dust collection cover which supports a cutting device having a rotary cutting blade such as a diamond cutter so as to be vertically moved with respect to a fixing cover supported on a base with which a cutting surface of a material to be cut is brought into contact. According to this dust collection cover, a grooving operation or a cutting operation can be performed by moving the rotary cutting blade within the fixing cover downward so as to protrude below a bottom surface of the base and then cutting a material to be cut with the protruding portion of the rotary cutting blade. This type of cutting is called a plunge cut.

U.S. Patent Publication No. 2008-0244910 discloses a dust collection cover used for the same kind of a cutting device, especially a dust collection cover with a double structure which supports a main body cover attached to a cutting device so as to be moved in an upward and downward direction with respect to a fixing cover supported on a base with which a cutting surface of a material to be cut is brought into contact. In the dust collection cover with the double structure, a cutting operation such as grooving can be performed by moving the cutting device together with the main body cover downwards so as to protrude the rotary cutting blade below a bottom surface of the base and then cutting a cutting surface of a material to be cut with the protruding cutting blade. According to the dust collection cover with the double structure, the main body cover is overlapped with the fixing cover, and accordingly, compared to the former dust collection cover, a higher sealability (high dust collection efficiency and/or strong dust collection power) of the dust collection cover with respect to the dusts and/or debris generated around a tip of the rotary cutting blade can be obtained along an overall vertical movable range of the rotary cutting blade.

However, it has been necessary to further improve the above latter dust collection cover with the double structure. In the prior art disclosed in U.S. Patent Publication No. 2008-0244910, high sealability can be obtained, but there is a problem that operability in exchanging a rotary cutting blade etc. may not be good enough. Generally, as is conventional in this type of dust collection cover, in order to exchange the rotary cutting blade, it is necessary to expose an attachment portion of the rotary cutting blade (a tip part of a spindle) by moving the cutting device upward. However, it has been difficult to obtain an enough operation area (exposed area) for attaching and/or detaching the rotary cutting blade etc. Furthermore, the attaching and/or detaching operation by use of, for example, a hexagon wrench or a spanner has been awkward and troublesome for a user.

In the prior art, in order to improve operability in exchanging the rotary cutting blade, a technique was disclosed such that a fixing cover is separated from a main body cover to expose the rotary cutting blade to a large extent. However, in the prior art, it sometimes happened that the fixing cover was accidentally separated from the main body cover when the dust collection cover was carried together with the cutting device. Furthermore, measures for preventing such defects was not sufficient.

Thus, there is a need in the art to provide measures to prevent the dust collection covers from being accidentally separated from each other, thereby improving operability mainly in exchanging the rotary cutting blade.

SUMMARY OF THE INVENTION

In the first aspect of the present teachings, a dust collection cover for covering around a rotary cutting blade of a cutting device is disclosed, wherein the dust collection cover has a main body cover (first cover) to which the cutting device is attached, and also has a fixing cover (second cover) having a base with which a cutting surface of a material to be cut is brought into contact. Furthermore, the main body cover (first cover) is coupled to the fixing cover (second cover) proximate a front end of the cutting device in a direction where a cutting operation is progressed, such that the main body cover (first cover) and the fixing cover (second cover) are relatively opened and closed with each other around a rotation support shaft. Furthermore, when an unlock operation of a separation lock member provided in the main body cover (first cover) is performed, the main body cover (first cover) and the fixing cover (second cover) are separated from each other.

According to the first aspect, unless the unlock operation of the separation lock member is performed, the main body cover (first cover) and the fixing cover (second cover) cannot be separated from each other. Because of this construction, for example, when the cutting device is carried, the main cover may not be accidentally separated from the fixing cover (second cover). Furthermore, by separating the fixing cover (second cover) from the main body cover (first cover) by the unlock operation of the separation lock member, an attaching and/or detaching operation of the rotary cutting blade can be rapidly and easily performed.

In another aspect of the present teachings, an opening stopper is provided in the fixing cover (second cover) such that a rotation of the main body cover (first cover) in an opening direction is restricted with respect to the fixing cover (second cover).

According to this aspect, by both the separation lock member and the opening stopper, the main body cover (first cover) can be furthermore prevented from accidentally separating from the fixing cover (second cover).

In another aspect of the present teachings, the main body cover (first cover) and the fixing cover (second cover) are separated from each other, (i) by releasing the opening stopper such that the fixing cover (second cover) is rotated with respect to the main body cover (first cover) to a larger opening angle than in a case where the opening stopper is not released, and (ii) by the unlock operation of the separation lock member.

According to this aspect, by releasing the opening stopper and then by rotating the fixing cover (second cover) with respect to the main body cover (first cover) to a larger opening angle than in a case where the opening stopper is not released, the fixing cover (second cover) can be separated from the main body cover (first cover) with the separation lock member unlocked. Because of this construction, in order to separate the main body cover (first cover) and the fixing cover (second cover) from each other, both the release of the opening stopper and the unlock operation of the separation lock member are needed. In this respect, the main body cover (first cover) can be furthermore prevented from accidentally separating from the fixing cover (second cover).

In another aspect of the present teachings, a support groove through which the rotation support shaft is inserted is provided in at least either one of the main body cover (first cover) and the fixing cover (second cover). Furthermore, by an opening operation with respect to an end part of the support groove to release the rotation support shaft from the support groove, the main body cover (first cover) and the fixing cover (second cover) are separated from each other.

According to this aspect, the main body cover (first cover) and the fixing cover (second cover) can be separated from each other by opening the end part of the support groove. Furthermore, the main body cover (first cover) and the fixing cover (second cover) cannot be separated from each other by closing the end part of the support groove. Because of this construction, a switch operation between the unseparable state and the separable state of the two covers can be easily performed. Thus, operability in exchanging the rotary cutting blade, and eventually usability of the dust collection cover can be improved.

In another aspect of the present teachings, the main body cover (first cover) and the fixing cover (second cover) are supported so as not to be separated from each other by preventing the rotation support shaft from releasing from the support groove with the support groove being covered by the separation lock member.

According to this aspect, the support groove can be rapidly opened and/or closed by a simple operation of the separation lock member, and accordingly a switch operation between the unseparable state and the separable state of the two covers can be easily performed.

In another aspect of the present teachings, the separation lock members are provided on both a left side and a right side of the first cover, and the left side and right side separation lock members are coupled together to perform the unlock operation.

According to this aspect, a separation lock state between the main body cover (first cover) and the fixing cover (second cover) can be reliably maintained by use of the pair of the separation lock members. Furthermore, according to this aspect, the unlock operation can be performed by the pair of the separation lock members that are joined with each other, and thus operability of the unlock operation can be improved compared to in a case where each one of the separation lock members is separately operated to perform an unlock operation.

According to another aspect of the present teachings, an indicator that indicates a position of the rotary cutting blade is adjustably positioned at a connection portion that connects the left side and right side separation lock members in a thickness direction of the rotary cutting blade.

According to this aspect, the connection part that joins the pair of the separation lock members can be utilized as a member for providing an indicator that can be used, for example, for positioning the rotary cutting blade to a marking line in a thickness direction thereof. Because of this construction, the connection part can have a function of providing the indicator, adding to the function of connecting the pair of the separation lock members.

In another aspect of the present teachings, the separation lock member is spring biased in a lock side where the main body cover (first cover) and the fixing cover (second cover) are supported so as not to be separated from each other.

According to this aspect, an accidental rotation of the separation lock member owing to vibration etc. can be prevented, and eventually the fixing cover (second cover) can be prevented from accidentally separating from the main body cover (first cover). Furthermore, since the separation lock member is biased in a lock side, a switch operation of the separation lock member from an unlock side can make the separation lock member to automatically return to a lock side, such that an operation of the separation lock member toward a lock side may not be forgotten. In this respect, an accidental separation of the main body cover (first cover) from the fixing member can be furthermore prevented.

In another aspect of the present teachings, the cutting device has the dust collection cover according to the above-described dust collection cover.

According to this aspect, the cutting device has the effects discussed above, and operability of the cutting device can be improved.

DETAILED DESCRIPTION OF EMBODIMENTS

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring significant aspects of the exemplary embodiments presented herein.

Hereinafter, an embodiment of the present teachings will be described with reference to FIGS. 1 to 26. As shown in FIGS. 1 to 7, a dust collection cover 20 in accordance with the embodiment, which may be attached to a cutting device 2 for cutting and grooving a stone material and/or a concrete block, or cutting an asphalt road surface, can prevent the dusts and/or debris generated by a cutting operation from being scattered around. The cutting device 2 may be the same as before, and accordingly a modification may not particularly be necessary. In the following description, the cutting blade 2 will be simply explained.

Figure 10:
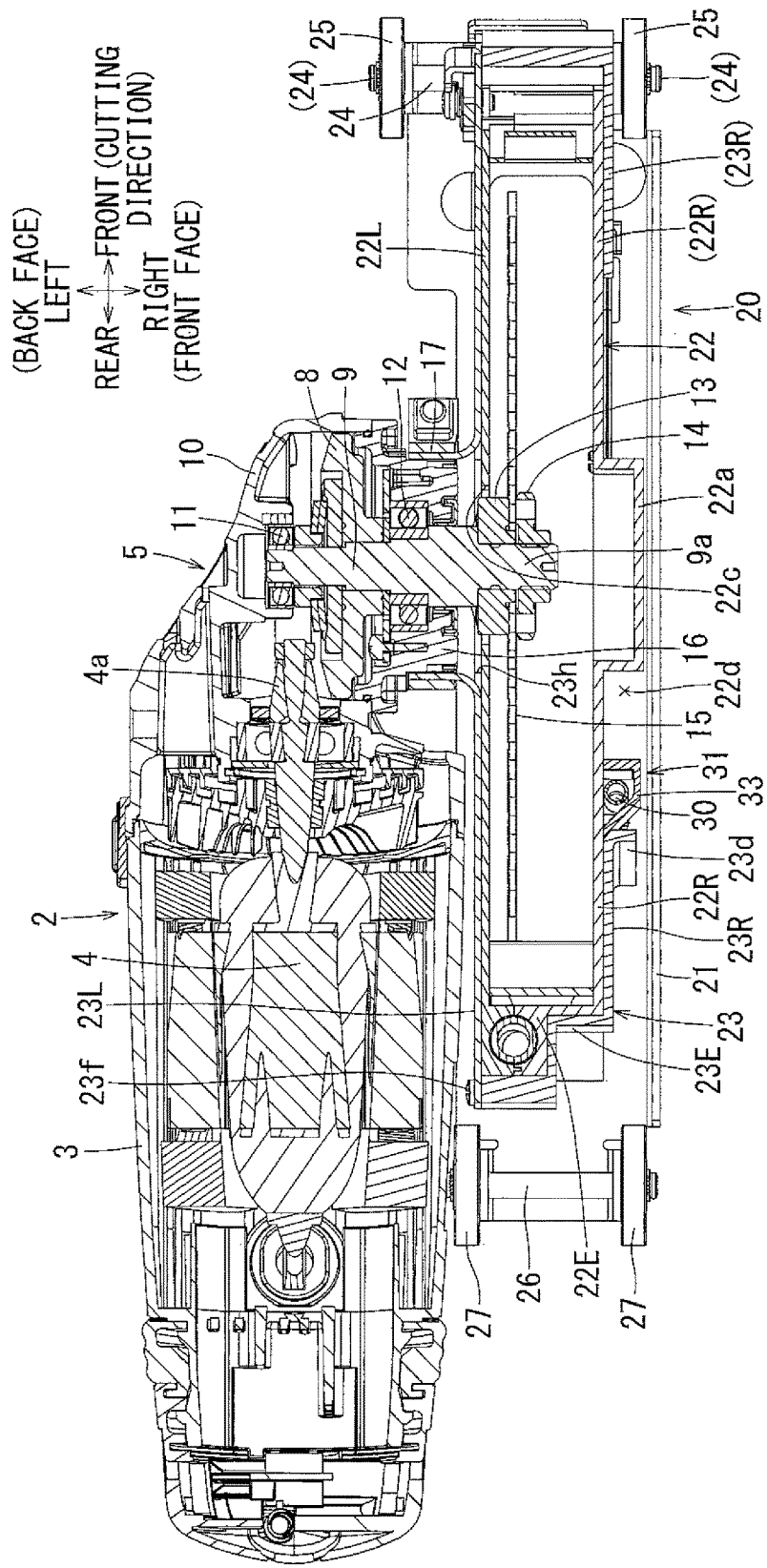
FIG. 10 is a cut-away view of the dust collection cover and the cutting device, which is viewed from the top.

FIG. 10 shows an internal structure of the cutting device 2. The cutting device 2 may be supported by a back face of the dust collection cover 20. Similarly to a disc grinder, the cutting device 2 may have a configuration in which an electric motor 4 is housed in a cylindrical tubular main body housing 3. A gear head 5 may be coupled to a front part of the main body housing 3. As shown in FIGS. 1 to 7, a handle 6 that a user holds and/or grips may be coupled to a rear part of the main body housing 3. A switch lever 6a may be located in a lower surface of the handle 6. A pulling operation of the switch lever 6a in an upward direction, which is made by use of a fingertip of the user's hand by which the switch lever 6a is held, may activate the electric motor 4. A power cord 7 for supplying power may be pulled out from a rear part of the handle 6.

As shown in FIG. 10, a drive gear 4a linked to an output shaft of the electric motor 4 may be engaged with a bevel gear as a driven gear 8. The driven gear 8 may be linked to a spindle 9. The spindle 9 may be rotatably supported around an axis perpendicular to the output shaft of the electric motor 4. The spindle 9 may be rotatably supported by a gear head housing 10 via bearings 11 and 12. A tip part of the spindle 7 may protrude toward within the dust collection cover 20 from the gear head housing 10. A circular rotary cutting blade 15 may be attached to the protruding portion. The rotary cutting blade 15 may be a cutter referred to as a diamond wheel, and may be rotated, for example, in a counterclockwise direction as shown in a void arrow in FIG. 2. As shown in FIG. 10, the rotary cutting blade 15 may be held and/or sandwiched between an inner flange 13 and an outer flange 14, and may be fixed to a screw shaft 9a of the spindle 9. Furthermore, the rotary cutting blade 15 can be removed from the spindle 9 by disconnecting the outer flange 14 from the screw shaft 9a (by loosening a screw joining of the outer flange 14 with respect to the screw shaft 9a).

The bearing 12 that rotatably supports the spindle 9 may be held by a bearing holder 16. The bearing holder 16 may be fixed at an opening of the gear head housing 10. Furthermore, the dust collection cover 20 may be coupled to the cutting device 2 by tightening a cramp portion 17 around an outer circumference of the bear holder 16. As described later, the cutting device 2 may be coupled to the main body cover 23 of the dust collection cover 20. As shown in FIGS.

2, 8, and 10, the cutting device 2 may be mounted on the back face (an outer wall 23L) of the main body cover 23 such that the cutting device 2 may be disposed extending (lying) along a front and rear direction with the axis of the spindle (output axis) extending along a left and right direction.

Figure 7:
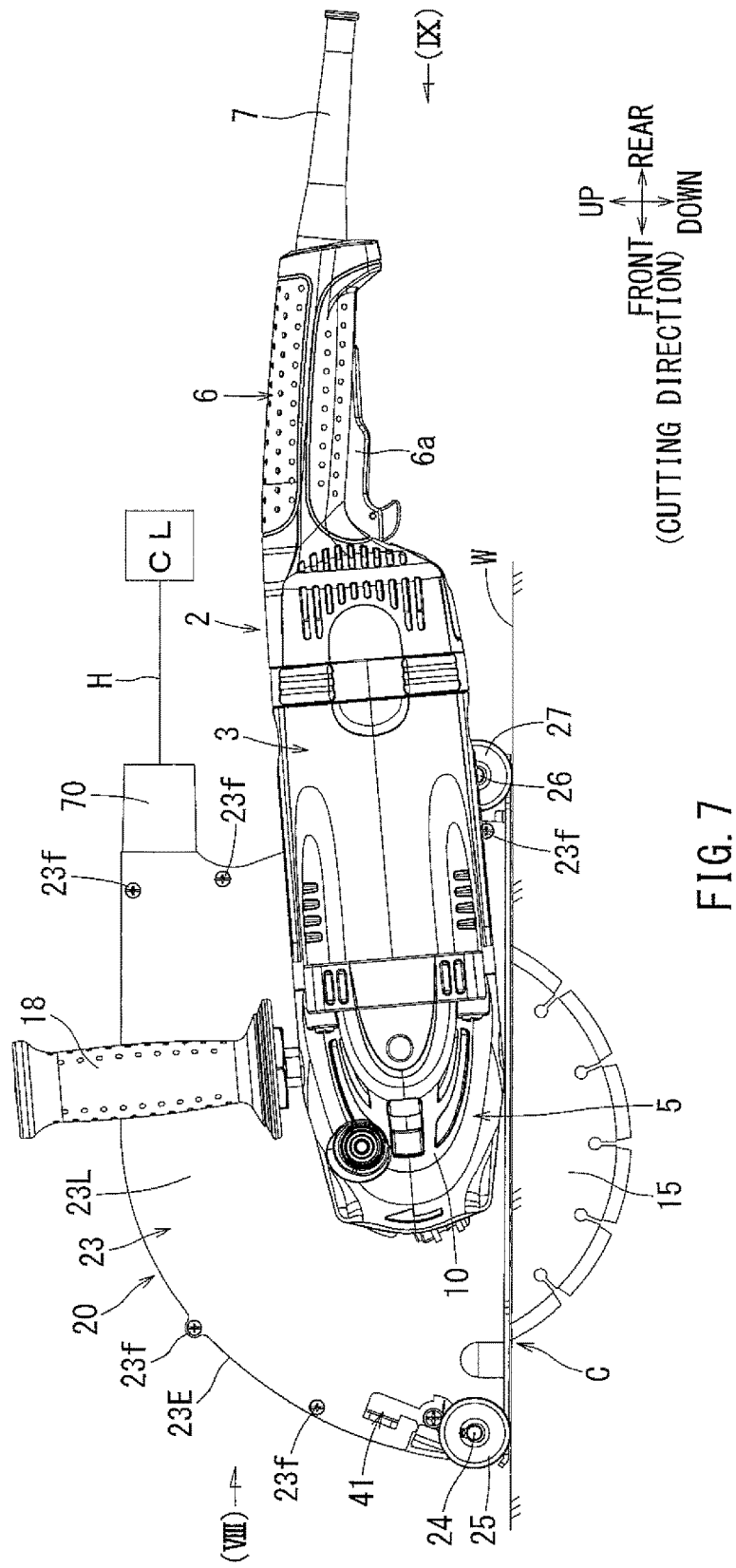
FIG. 7 is a back view of the dust collection cover and the cutting device, which is viewed from a direction indicated by an arrow (VII) in FIG. 5.
Figure 8:
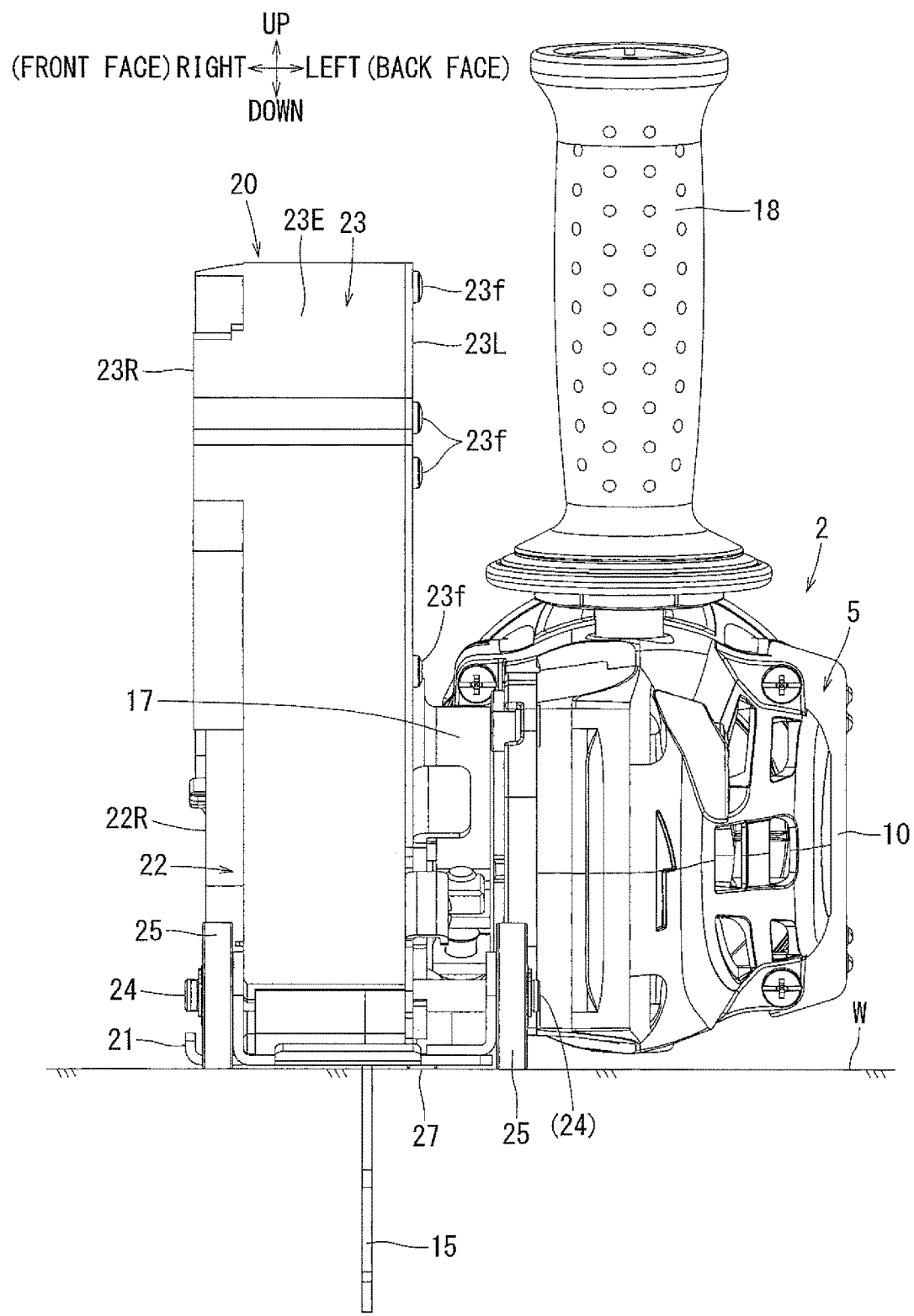
FIG. 8 is a view of the dust collection cover and the cutting device, which is viewed from a direction indicated by an arrow (VIII) in FIG. 7.
Figure 9:
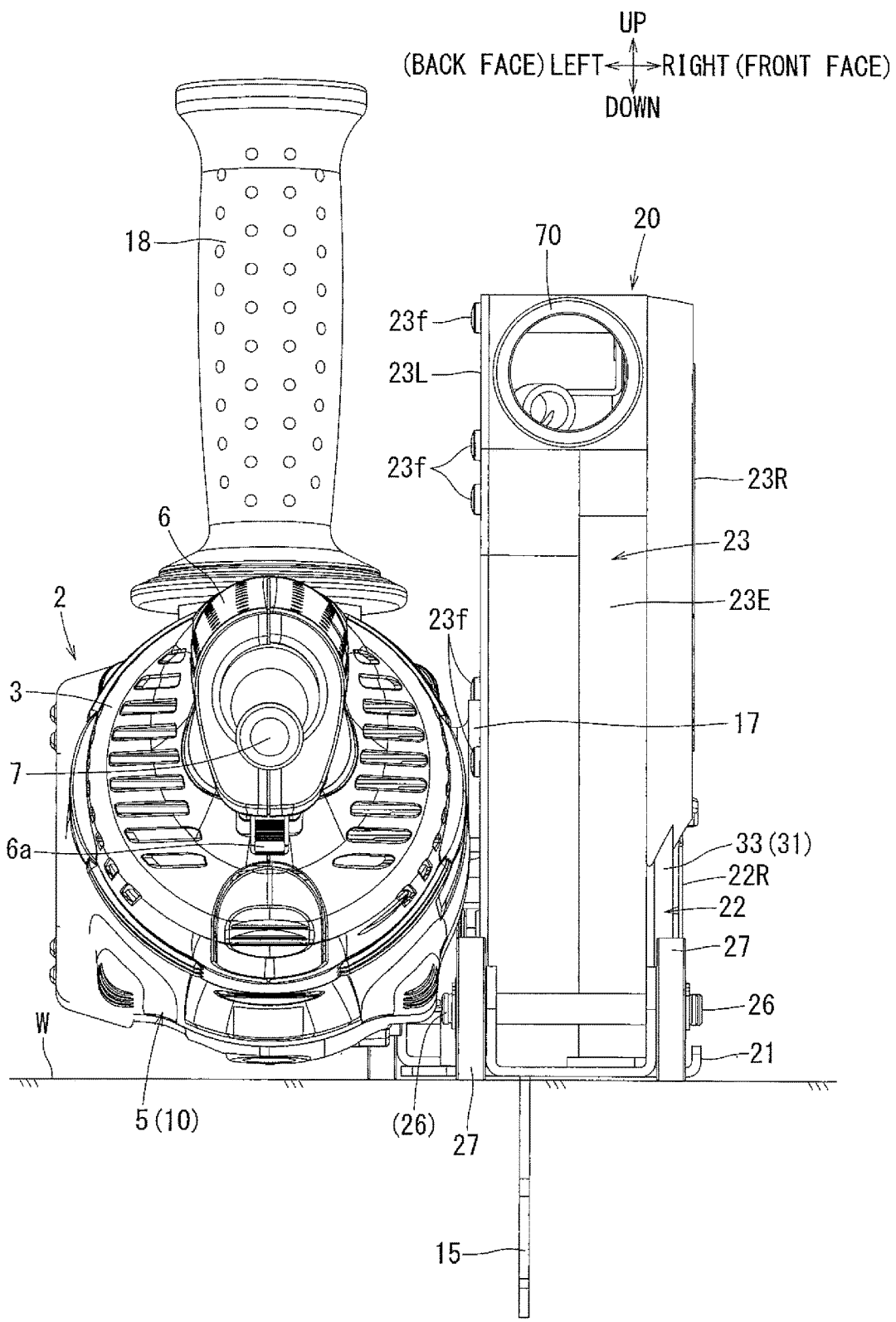
FIG. 9 is a view of the dust collection cover and the cutting device, which is viewed from a direction indicated by an arrow (IX) in FIG. 7.

As shown in FIGS. 7 to 9, a front grip 18 may be disposed on an upper face of the gear head housing 10. The user may hold the handle 6 by one hand and the front grip 18 by another hand to hold the cutting device 2 in a stable manner and/or posture. Accordingly, a cutting operation can be precisely and rapidly performed.

The dust collection cover 20 may have a main function of preventing the dusts and/or debris generated at a cutting position C from being scattered around by blocking a right side, a left side, and an upper circumference side of the rotary cutting blade 15. As shown in FIGS. 1 to 7, the dust collection cover 20 may have a steel base 21 that may be brought into contact with a cutting surface W of the material to be cut, a resin fixing cover 22 that may be fixed to the base 21, and a main body cover 23 that may be supported so as to be rotated in an upward and downward direction with respect to the fixing cover 22. The main body cover 23 may be supported so as to be rotated with respect to the fixing cover 22 in the upward and downward direction via a rotary support shaft 24. The rotary support shaft 24 may also be used for an axle of a front wheel 25 (front wheel shaft). The front wheel 25 may be attached to both left and right ends of the rotary support shaft 24. Each of the left and right front wheels 25 may be brought into contact with the cutting surface W of the material to be cut.

Figure 2:
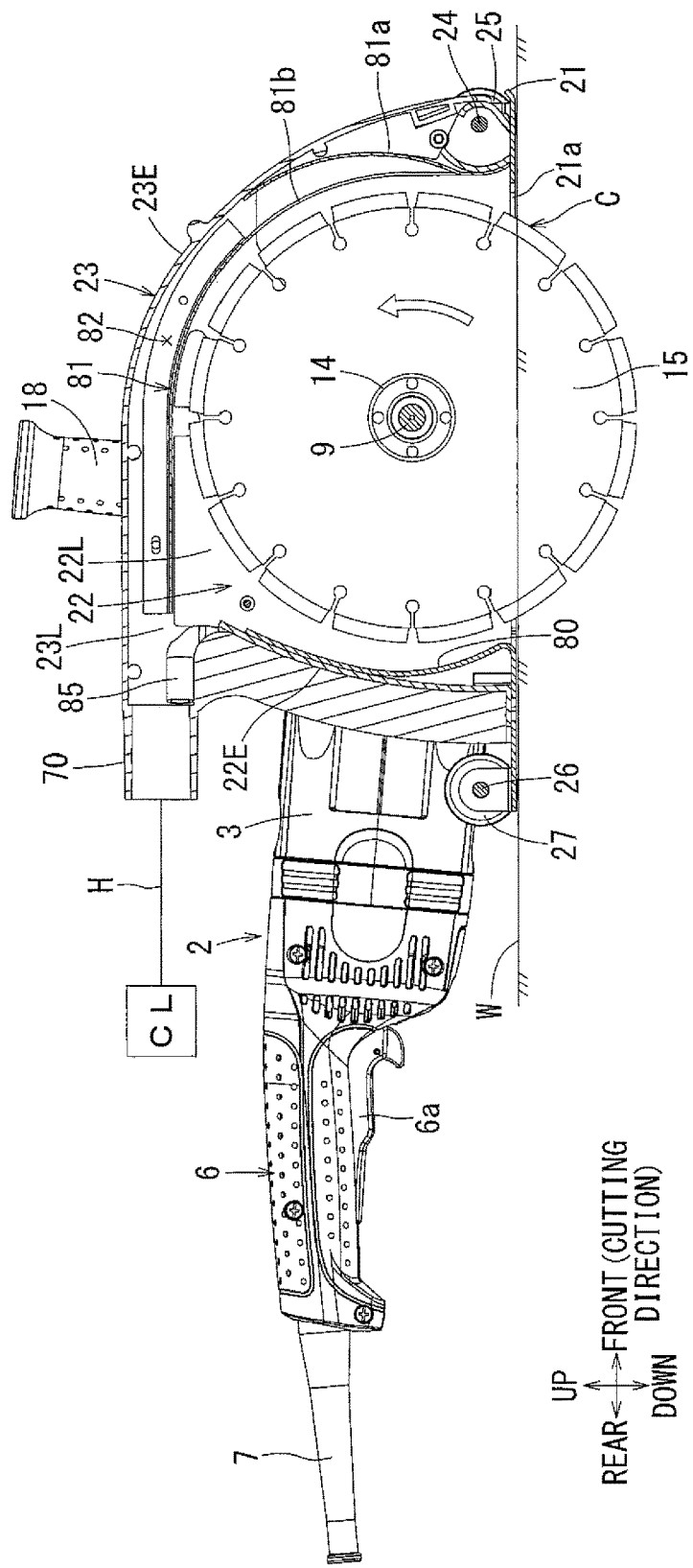
FIG. 2 is a partial vertical cutaway view of the dust collection cover in a state where the main body cover is located in the lower end.
Figure 6:
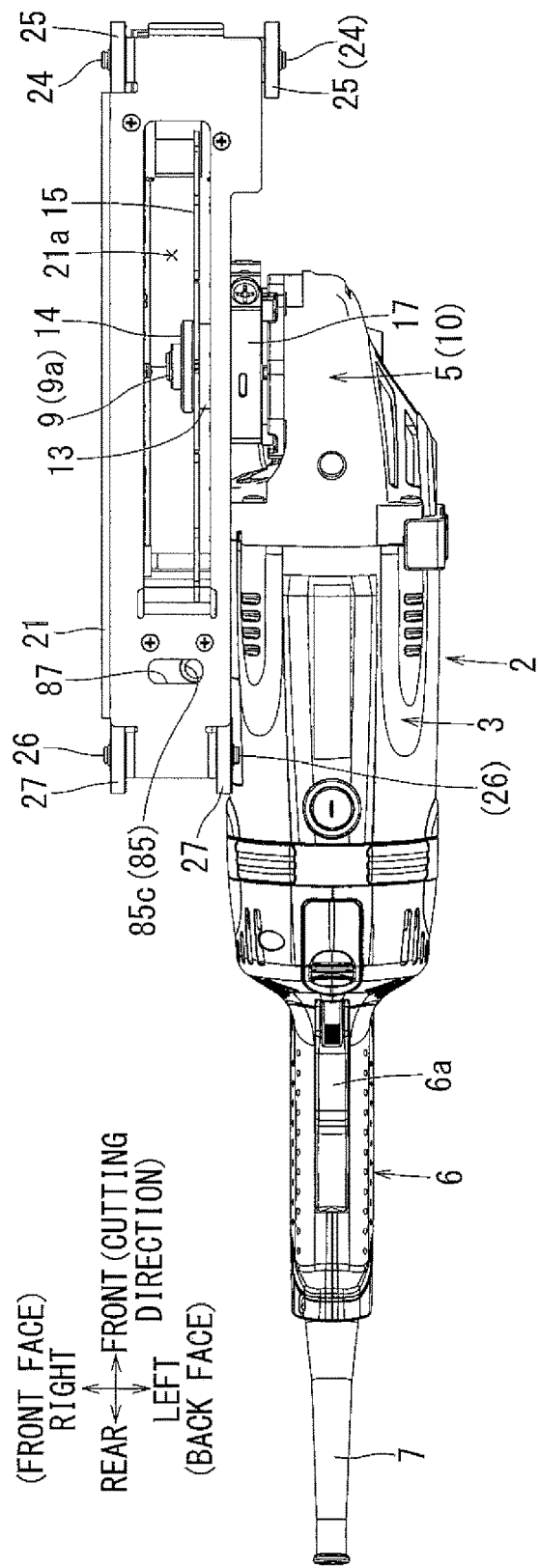
FIG. 6 is a bottom view of the dust collection cover and the cutting device, which is viewed from a direction indicated by an arrow (VI) in FIG. 1.

A rear wheel shaft 26 may be supported around a rear end of the base 21. The rear wheel shaft 26 may be disposed parallel to the rotary support shaft 24 and rotatably supported extending in a left and right width direction. A rear wheel 27 may be attached to both left and right ends of the rear wheel shaft 26. Each of the left and right rear wheels 27 may be brought into contact with the cutting surface W of the material to be cut. By the left and right front wheels 25 and the left and right rear wheels 27, the base 21 may be disposed in a slightly floated manner with respect to the cutting surface W, and accordingly the base 21 may be smoothly moved along the cutting surface W. As shown in FIGS. 2 and 6, a rectangular window 21a may be provided in the center of the base 21. A lower part of the rotary cutting blade 15 may protrude below a lower surface of the base 21 through the window 21a.

As shown in, for example, FIG. 10, the fixing cover 22 that is attached and/or fixed to the upper surface of the base 21 may have inner walls 22L and 22R rising from a left side and a right side of the window 21a, respectively, and extending upward to cover mainly both the left and right sides of the rotary cutting blade 15. Furthermore, the fixing cover 22 may also have an inner peripheral part 22E that connects rear portions of the left and right inner walls 22L and 22R to cover mainly a rear part of the rotary cutting blade 15. As shown in, for example, FIG. 10, the main body cover 23 to which the cutting device 2 is attached may have a left outer wall 23L and a right outer wall 23R that are respectively disposed outside the left and right inner walls 22L and 22R, and also may have an outer peripheral part 23E that connects front and rear end portions of the left and right outer walls 23L and 23R to cover approximately an upper half circumference of the rotary cutting blade 15. As shown in FIGS. 10, 12, 13, 15, and 16, a relief part 22c of an elongated hole that can pass through the spindle 9 of the cutting device 2 may be formed in the left inner wall 22L of the fixing cover 22. The relief part 22c of an elongated hole may be formed in a curved manner, more specifically, in circular arc shape centering on the rotary support shaft 24. Furthermore, the relief part 22c may be open at an upper portion of the inner wall 22L.

The right side (front face side) outer wall 23R and the outer peripheral part 23E of the main body cover 23 may be made from resin. On the other hand, the left side (back face side) outer wall 23L of the main body cover 23 may be made from steel plate. As shown in FIG. 7, the left side outer wall 23L may be screwed and connected to left edge part of the resin outer peripheral part 23E by fixing screws 23f at plurality places. The cramp portion 17 for connecting the cutting device 2 may be connected to the left side outer wall 23L by welding. As shown in FIG. 10, in correspondence with an inner peripheral hole of the cramp 17, a circular relief hole 23h may be provided in the left side outer wall 23L of the main body cover 23. The spindle 9 may protrude toward within the dust collection cover 20 through the relief hole 23h of the main body cover 23 and the relief part 22c of the fixing cover 22. The cutting device 2 can be removed from the dust collection cover 20 by removing the spindle 9 from the rotary cutting blade 15 and loosening the cramp portion 17.

Figure 15:
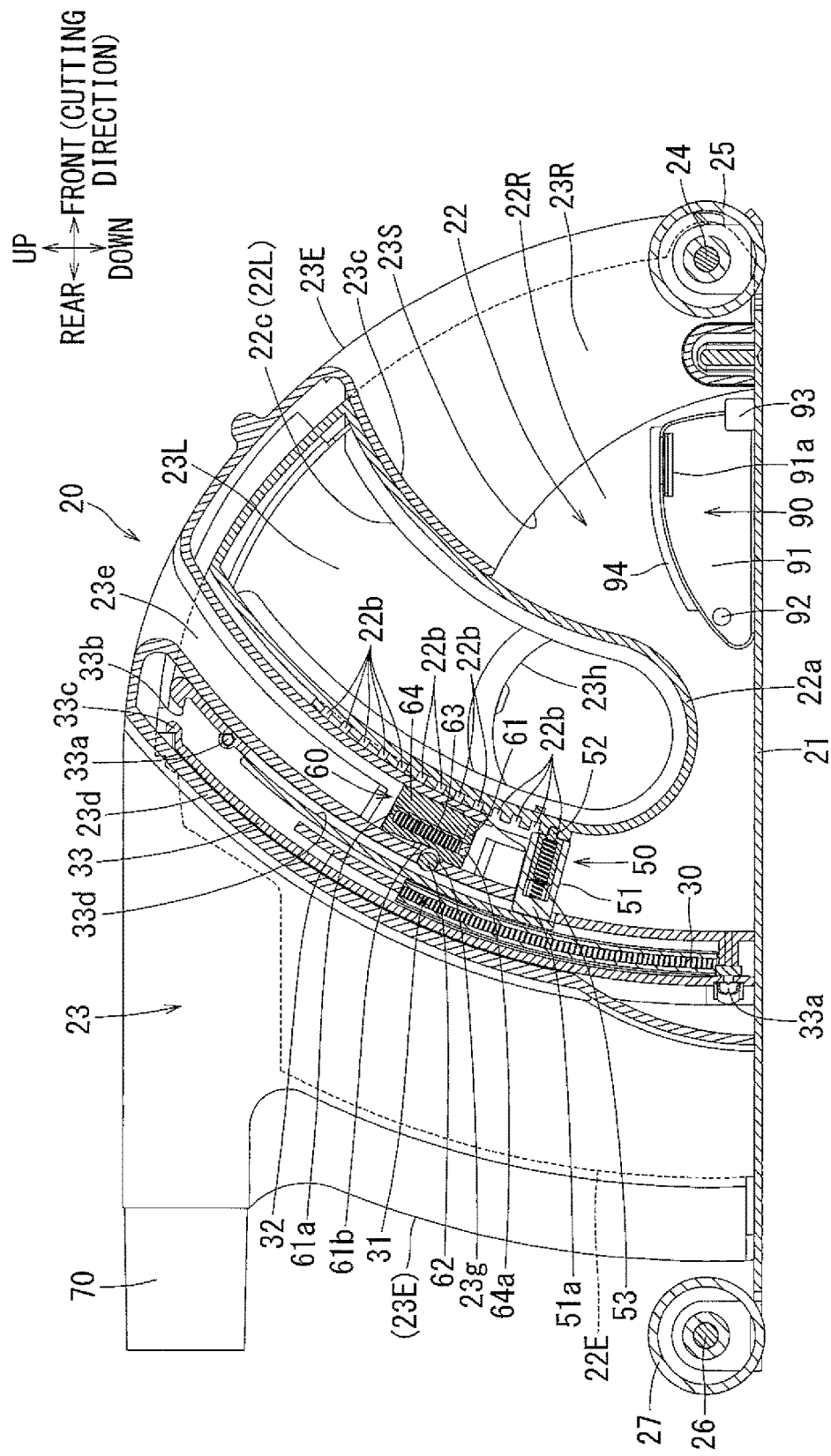
FIG. 15 is another front view of the dust collection cover, which is a partial cut-away view taken along the line (XV)-(XV) in FIG. 5, showing that the main body cover is completely closed (located in a lower end) with respect to a fixing cover with the cutting device removed for clarity.
Figure 16:
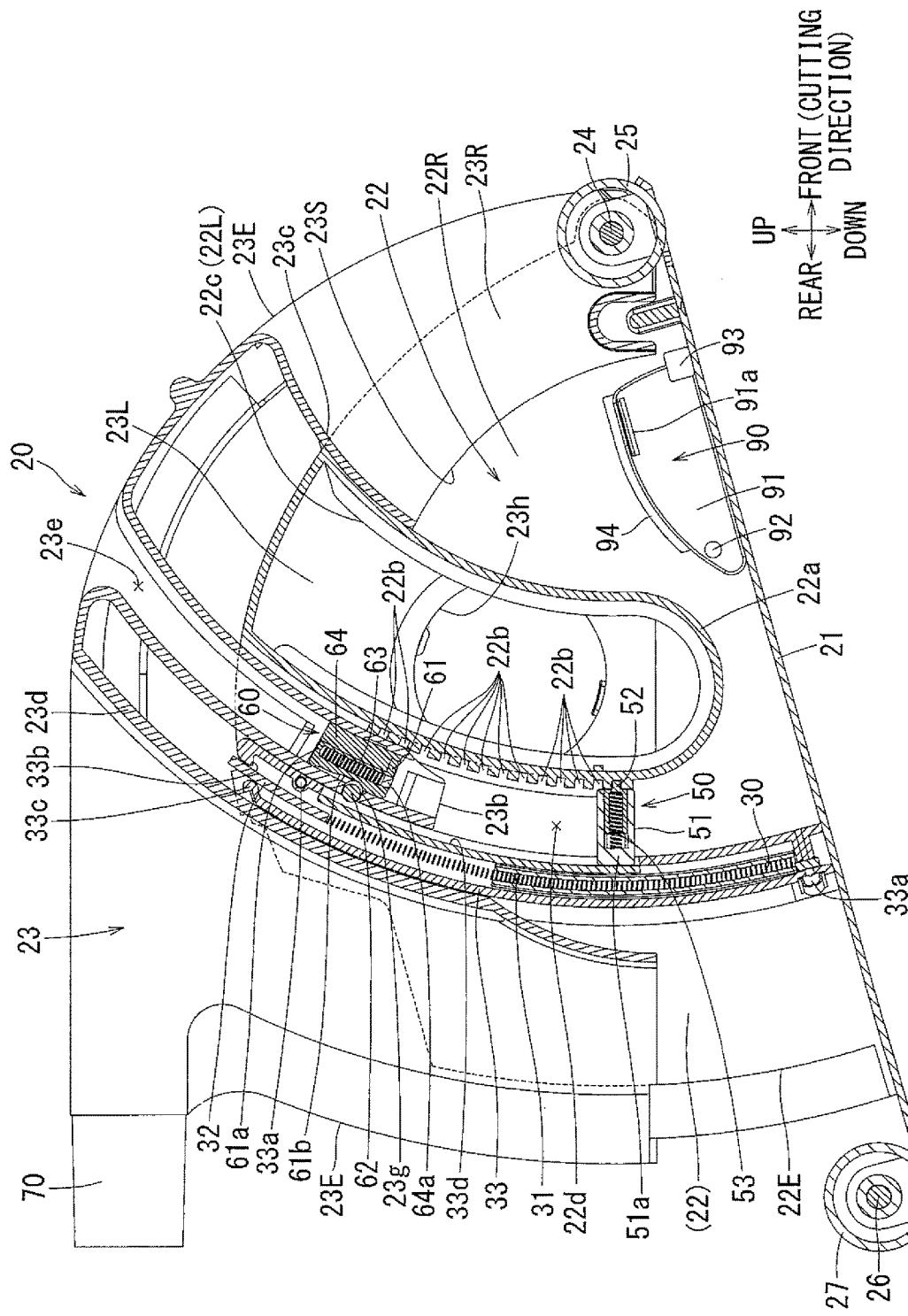
FIG. 16 is another front, and partial cut-away view of the dust collection cover with the cutting device removed for clarity, showing a state where the main body cover is operated to be opened in an upward direction from a state shown in FIG. 15.

The main body cover 23 may be biased by a compression spring 30 in a direction such that the main body cover 23 rotates upward with respect to the fixing cover 22. As shown in FIGS. 15 and 16, the compression spring 30 may be retained in the right side inner wall 22R of the fixing cover 22, more specifically, within a spring holder 33 (in a spring retaining portion 31) that is attached to the right side of the fixing cover 22 and is located opposite to the cutting device 2 with respect to the rotary cutting blade 15. The spring holder 33 may be attached to the fixing cover 22 along an arc centered on the rotary support shaft 24 of the main body cover 23. Furthermore, the spring holder 33 may be attached to the fixing cover 22 on the opposite side of the rotary support shaft 24 with respect to the rotation center (spindle 9) of the rotary cutting blade 15. The compression spring 30 may be retained by the spring holder 33 (the spring retaining portion 31) so as to be expanded and contracted, along the arc centered on the rotary support shaft 24 in an area opposite to the rotary support shaft 24 with respect to the rotation center (spindle 9) of the rotary cutting blade 15.

As shown in FIG. 15, the spring holder 33 may be fixed to the right side inner wall 22R of the fixing cover 22 by using two fixing screws 33a. A removal prevention portion 33c for preventing the compression spring 30 from coming out of the spring holder 33 may be formed at an upper part of the spring holder 33 (of the fixing cover 22). A pressing portion 32 for pressing the compression spring 30 may be formed in the main body cover 23 as shown in FIG. 15, and a pressing portion entering path 33b for passing through the pressing portion 32 may be formed at the removal prevention portion 33c as shown in FIG. 16. The pressing portion 32 may be integrally formed with an inner surface of the right side outer wall 23R of the main body cover 23. Furthermore, the pressing portion 32 may be formed in a curved manner, i.e., in a circular shape centering on the rotary support shaft 24.

When the main body cover 23 is rotated in the upward and downward direction with respect to the fixing cover 22, the pressing portion 32 may be moved within the spring holder 33 in the upward and downward direction together with the main body cover 23. When the main body cover 23 is rotated downward, an upper end part of the compression spring 30 is pressed downward by the pressing portion 32. Accordingly, a biasing force to rotate the main body cover 23 upward (to rotate the fixing cover 22 downward) may be generated. When the main body cover 23 is rotated upward, the pressing portion 32 may be moved together with the main body cover 23. Accordingly, the compression spring 30 may be expanded and a biasing force may be gradually reduced.

When a user carries the cutting device 2 together with the dust collection cover 20 holding and/or grasping the handle 6, the fixing cover 22 is rotated downward with respect to the main body cover 23, and the fixing cover 22 may be hung on the main body cover 23 via the rotary support shaft 24 by a biasing force of the compression spring 30. On the contrary, when a cutting operation is to be performed, a cutting surface W of the material to be cut may be brought into contact with the base 21, and accordingly the fixing cover 22 may not be moved with respect to the cutting surface W. In other words, the fixing cover 22 may not be hung on the main body cover 23, and the main body cover 23 may be rotated in the upward and downward direction together with the cutting device 2 with respect to the fixing cover 22. In this way, a rotation reference, i.e., the fixing cover 22 or the main body cover 23, both of which are rotatably coupled with each other, may be changed between when the user carries the cutting device 2 and when the user performs a cutting operation. In the explanation of this specification, a rotation reference may be exchanged as needed. Furthermore, in this specification, regarding a rotation operation of the main body cover 23 with respect to the fixing cover 22, a direction in which the rotary cutting blade 15 protrudes below a lower surface of the base 21 may be referred to as a closing direction, and a direction in which a protruding amount of the rotary cutting blade 15 that protrudes below the lower surface of the base 21 is reduced may be referred to as an opening direction. Accordingly, a downward movement of the main body cover 23 (a movement in which the main body cover 23 is approached to the fixing cover 22) may be referred to as a rotation movement in a closing direction, and an upward direction of the main body cover 23 (a movement in which the main body cover 23 is spaced away from the fixing cover 22) may be referred to as a rotation movement in an opening direction.

Figure 1:
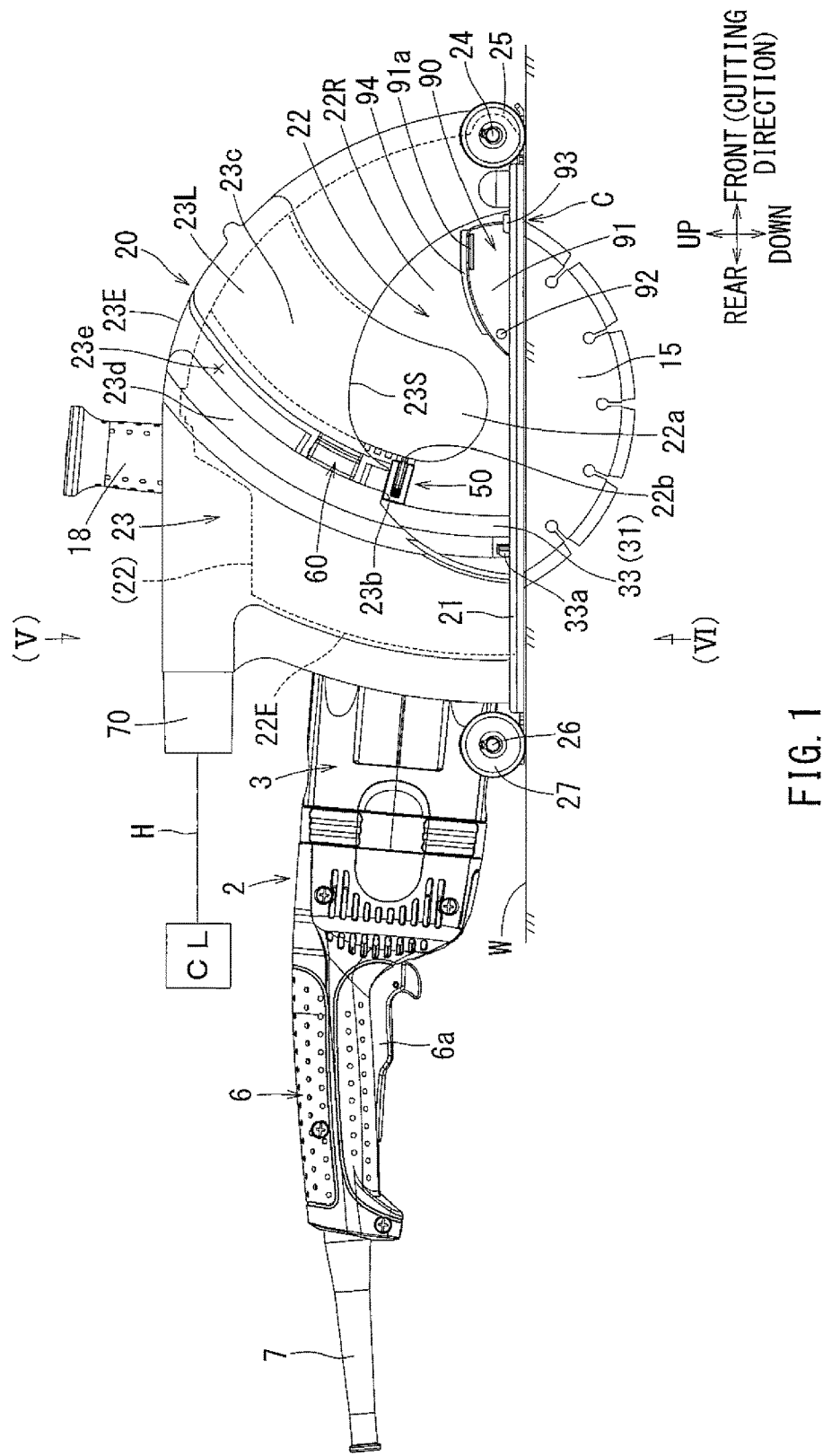
FIG. 1 is a front view of a dust collection cover, showing a right side thereof with respect to a cutting direction, according to one exemplary embodiment of the present disclosure in a state where a main body cover is located in a lower end.
Figure 3:
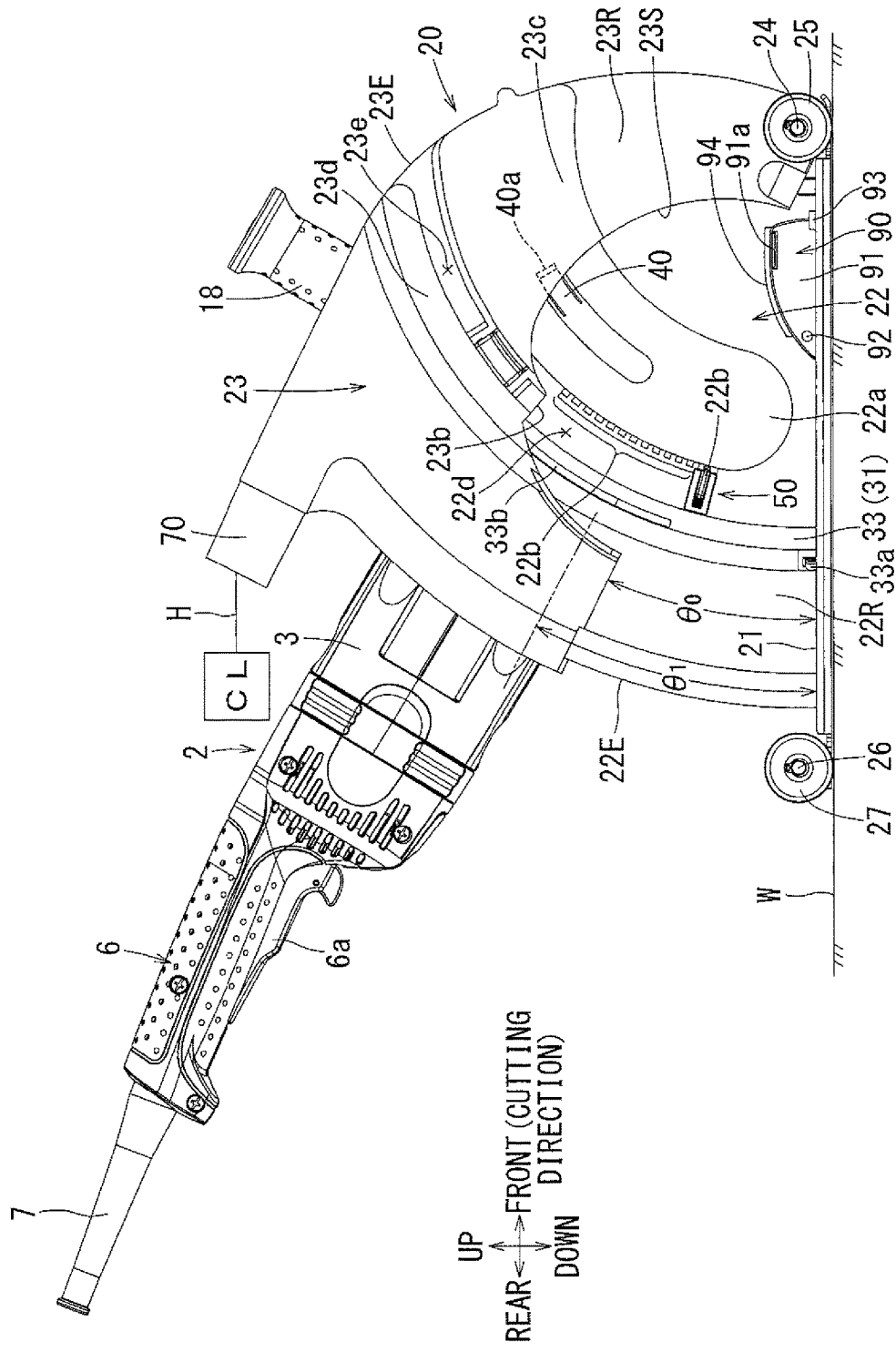
FIG. 3 is another front view of the dust collection cover in a state where the main body cover is located at (returned to) an opening restriction angle
Figure 4:
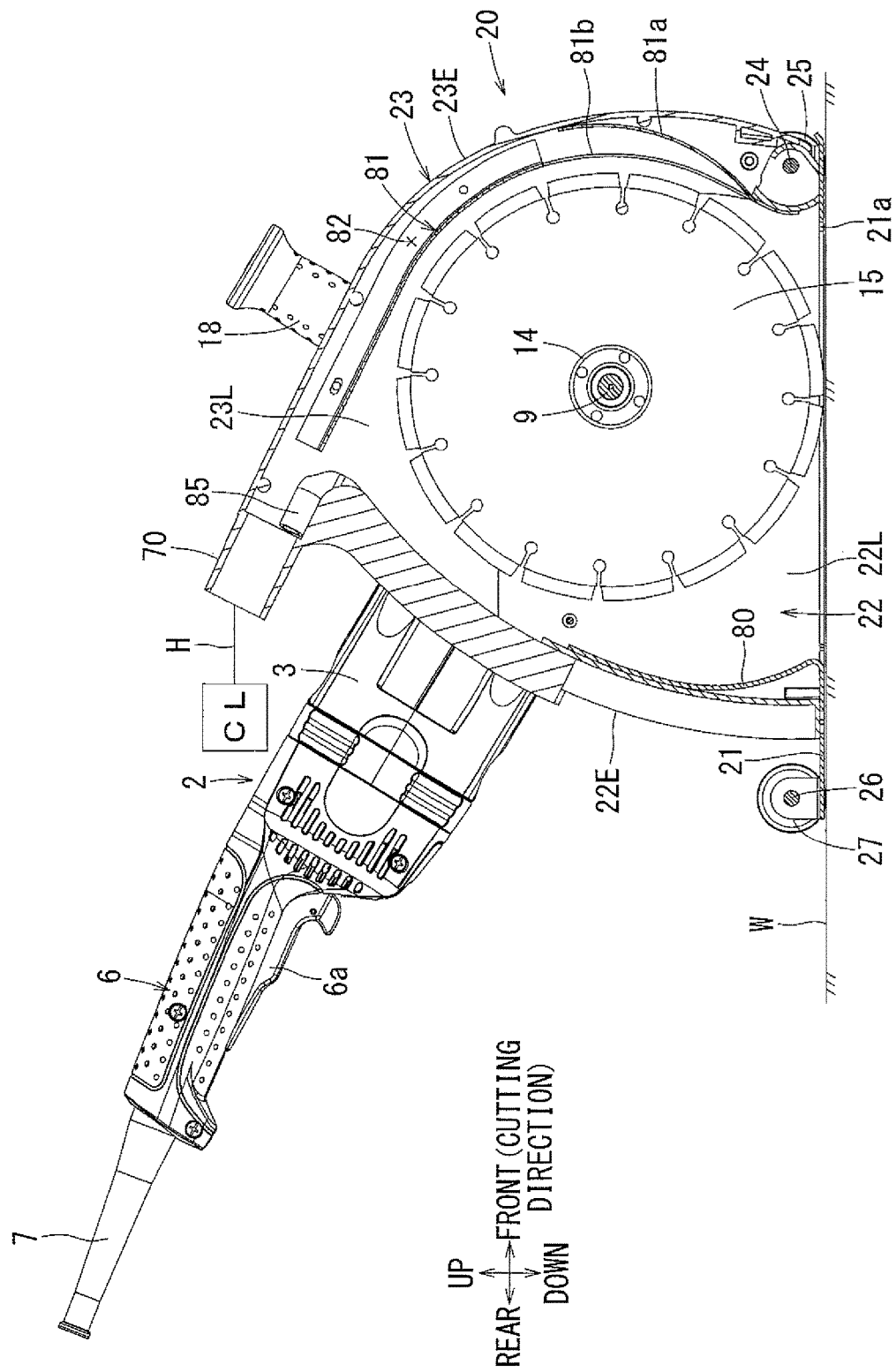
FIG. 4 is another partial vertical cut-away view of a cutting device in a state where the main body cover is located at (returned to) the opening restriction angle.
Figure 5:
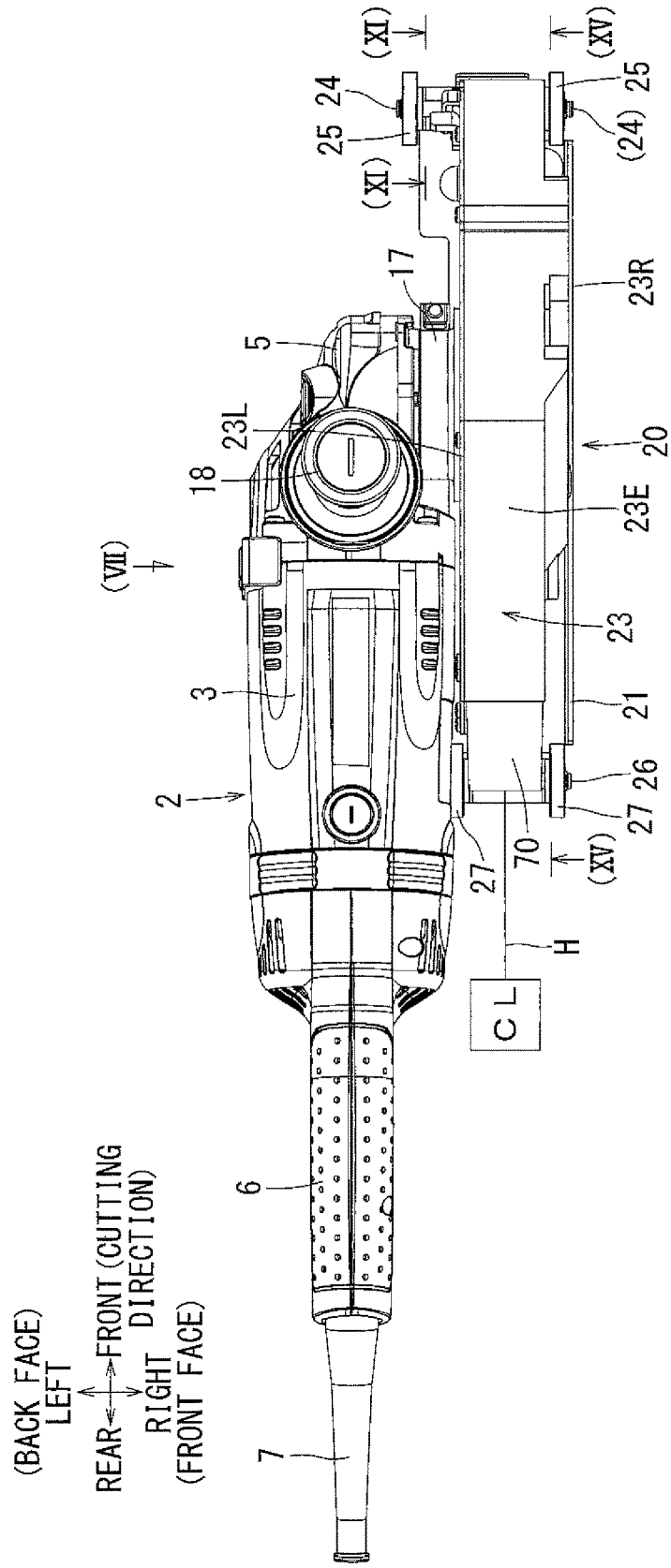
FIG. 5 is a top view of the dust collection cover and the cutting device, which is viewed from a direction indicated by an arrow (V) in FIG. 1.

The main body cover 23 to which the cutting device 2 is attached may be biased by a biasing force of the compression spring 30 in a direction such that the main body cover 23 is rotated upward with respect to the fixing cover 22. As shown in FIGS. 15 and 16, a biasing force may be generated by an upper end portion of the compression spring 30 being pressed against the pressing portion 32. As shown in FIGS. 3 and 4, when the main body cover 23 is rotated in an upward direction to a predetermined angle (an opening restriction angle $\theta_0$ in the present embodiment) with respect to the fixing cover 22, a lower part of the rotary cutting blade 15 may not protrude below a lower surface of the base 21 and may be completely housed in and/or covered with the dust collection cover 20. On the other hand, as shown in FIG. 1, when the main body cover 23 is pressed against a biasing force of the compression spring 30 with the handle 6 held, the rotary cutting blade 15 may protrude below the lower surface of the base 21 and may cut into the cutting surface W of the material to be cut.

When the main body cover 23 is rotated upward with respect to the fixing cover 22 to a large extent, the pressing portion 32 may be retreated from within the spring retaining portion 31 through the pressing portion entering path 33b. When the pressing portion 32 is retreated from within the spring retaining portion 31, the compression spring 30 may be furthermore expanded and an upper end of the compression spring 30 may contact the removal prevention portion 33c. Thus, the compression spring 30 may remain within the spring retaining portion 31. Because of this construction, when the main body cover 23 is rotated downward after that, the pressing portion 32 may be entered into the spring retaining portion 31 through the pressing portion entering path 33b. The upper end of the compression spring 30 may be pressed again by the pressing portion 32 to generate a biasing force to rotate the main body cover 23 upward.

As shown in FIGS. 3 and 4, when the main body cover 23 is rotated upward with respect to the fixing cover 22 to a predetermined angle (the opening restriction angle $\theta_0$ in the present embodiment), a further rotation of the main body cover 23 upward may be restricted by an opening stopper 40. As shown in FIG. 3, a stepped part 22a, which may be configured to be one step higher than the other part, may be formed on the right side inner wall 22R of the fixing cover 22. The stepped part 22a may be formed in a curved manner along an arc centering on the rotary support shaft 24. The opening stopper 40 may be formed in the center of the stepped part 22a. The opening stopper 40 may be formed in a cut and raised shape when the fixing cover is formed, and also an engaging claw 40a may be formed at a tip end of the opening stopper 40. The engagement claw 40a may be engaged with an engagement portion that is formed in an inner surface of the right side outer wall 23R of the main body cover 23, so that a relative rotation of the fixing cover 22 with respect to the main body cover 23 in an opening direction may be restricted.

Owing to the opening stopper 40, for example, when a user carries the cutting device 2 together with the dust collection cover 20 with the handle 6 held, a rotation of the fixing cover 22 with the main body cover 23 may be restricted within the predetermined angle, and accordingly, the fixing cover 22 may be hung on the main body cover 23 via the rotary support shaft 24. Even in this condition, because an angle between the fixing cover 22 and the main body cover 23 may be within the opening restriction angle $\theta_0$, the rotary cutting blade 15 may not protrude below the lower surface of the base 21.

An engagement condition of the engagement claw 40a with the engagement portion of the main body cover 23 may be released by the opening stopper 40 being pushed with a finger of the user. By the release of the engagement claw 40a, the fixing cover 22 may be further rotated with respect to the main body cover 23 in the opening direction beyond the opening restriction angle $\theta_0$. In more detail, by the release of the engagement claw 40a of the opening stopper 40, the fixing cover 22 may be further rotated with respect to the main body cover 23 in the opening direction to an opening angle $\theta_1$ (approximately 45° in this embodiment). Then, the main body cover 23 can be separated from the fixing cover 22, as described later. Furthermore, by separation of the main body cover 23 from the fixing cover 22 from each other, the rotary cutting blade 15 may be exposed to a large extent, and accordingly an operation such as an exchange of the rotary cutting blade etc. can be easily and rapidly performed.

Figure 11:
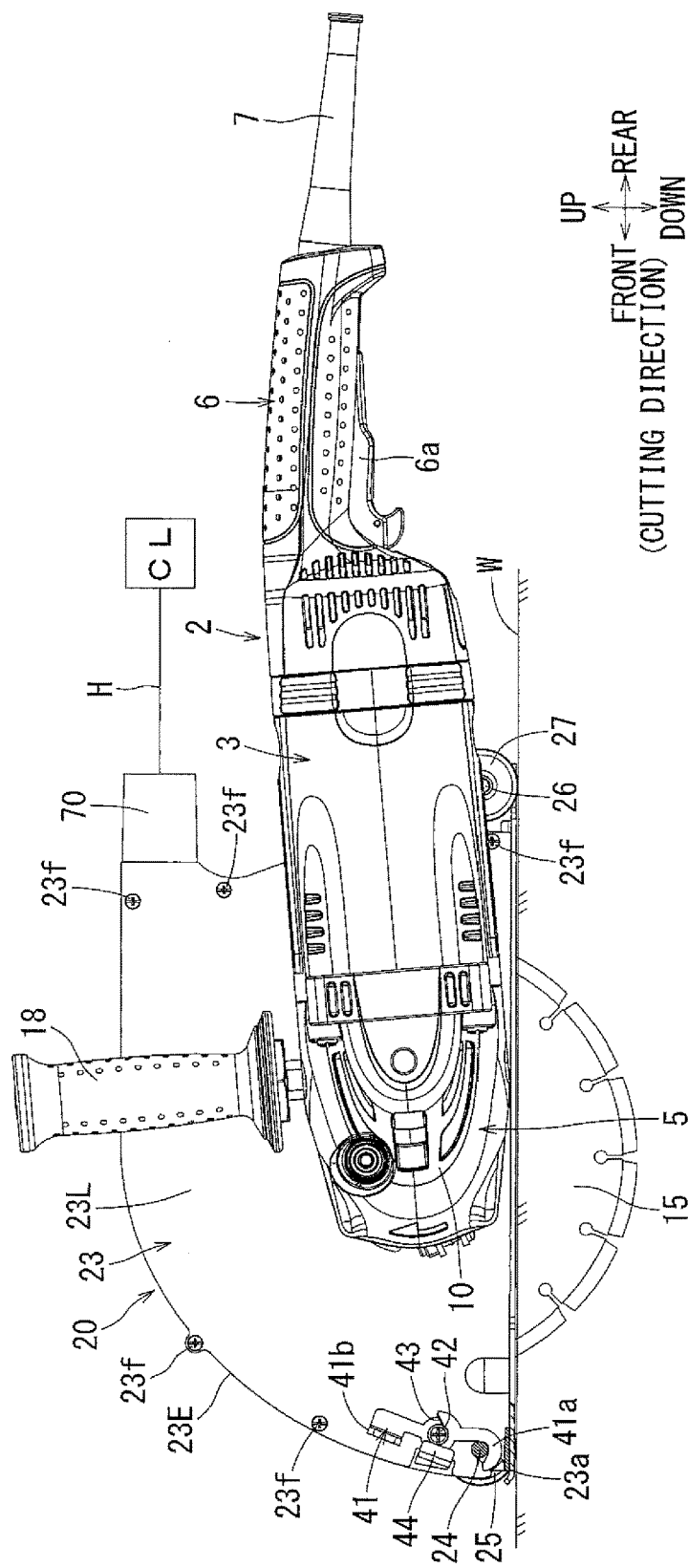
FIG. 11 is a back view of the dust collection cover, in which a front part of the dust cover, especially a separation lock member is shown taken along the line (XI)-(XI) in FIG. 5.
Figure 12:
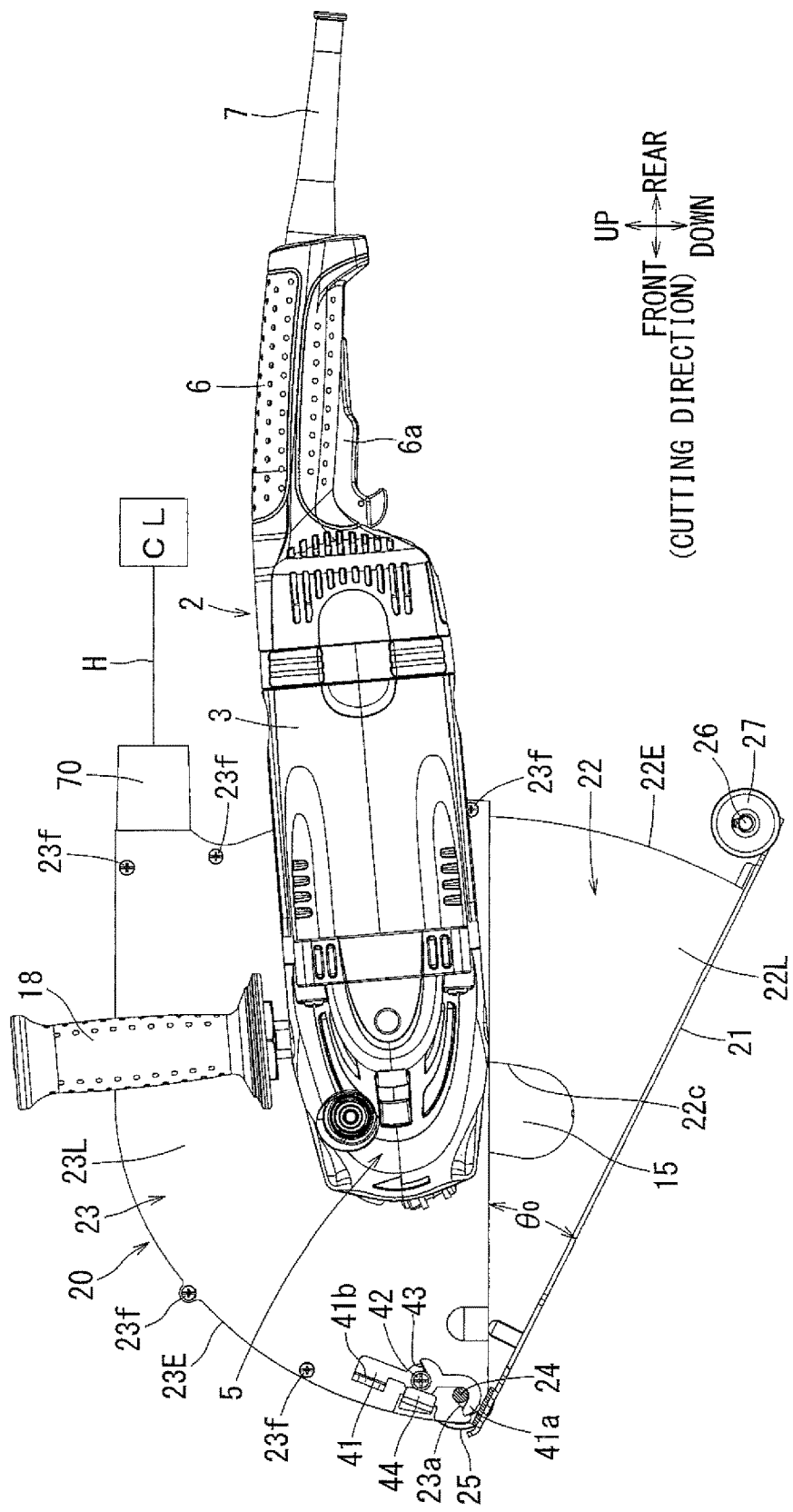
FIG. 12 is another back view of the dust collection cover, in which the main body cover is operated to be opened from a state shown in FIG. 11.
Figure 13:
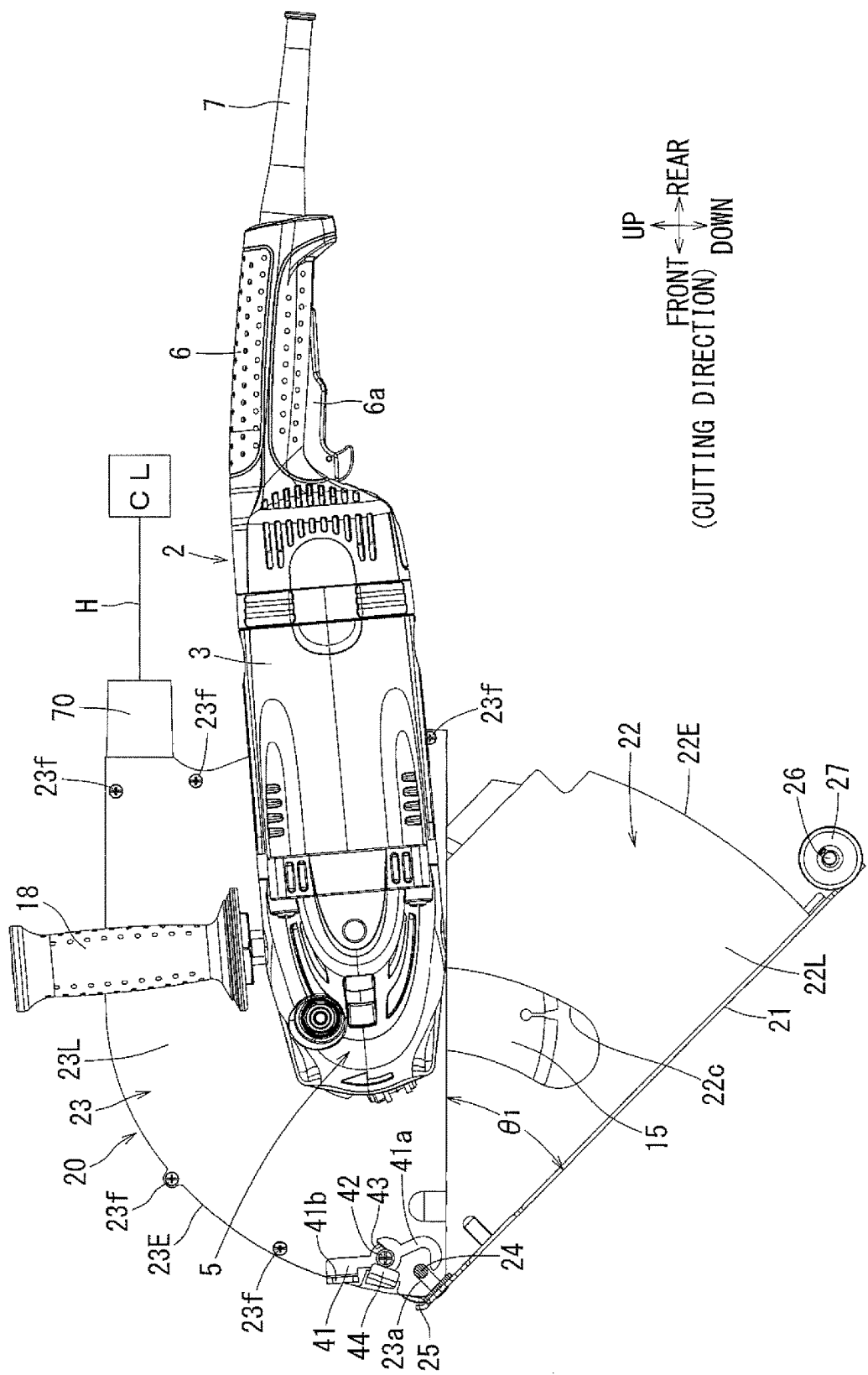
FIG. 13 is another back view of the dust collection cover, in which the separation lock member is operated to an unlock side from a state shown in FIG. 12.
Figure 14:
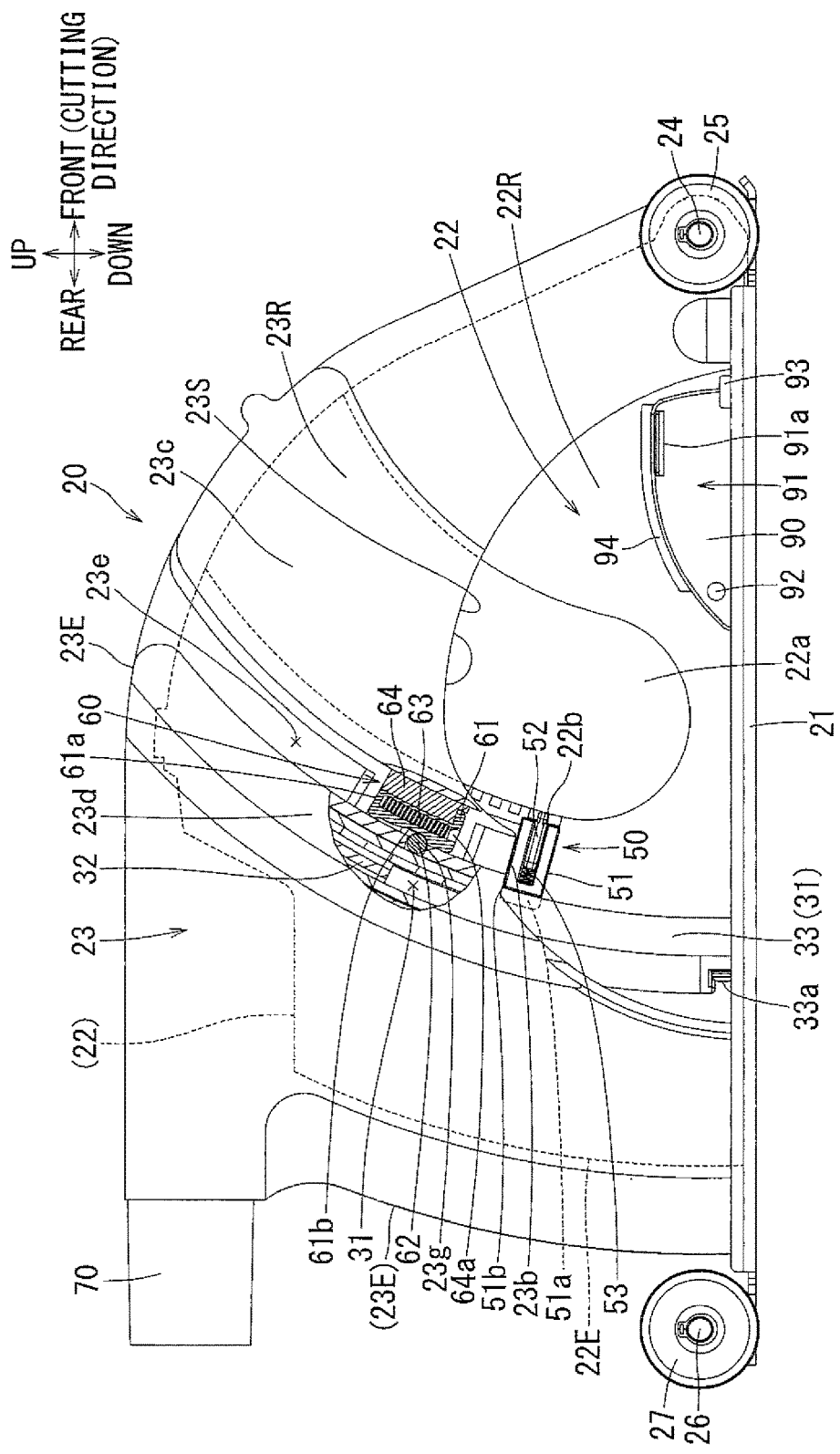
FIG. 14 is a front view of the dust collection cover, in which a fixing stopper and a peripheral area around the fixing stopper are shown in a partial vertical cut-away view with the cutting device removed for clarity.

As shown in FIGS. 11 to 13, a support groove 23a may be formed at a front part of the main body cover 23. The support groove 23a may be symmetrically formed in both the right and left outer wall 23L and 23R. The rotary support shaft 24 may be inserted through the right and left support grooves 23a, and the main body cover 23 may be joined to the fixing cover 22 such that the main body cover 23 may be relatively rotatable with respect to the fixing cover 22. As shown in FIG. 13, the right and left support grooves 23*a* may be formed by cuts at a front edge portion of the right and left outer walls 23R and 23L, respectively. Because of this construction, the rotary support shaft 24 may be extracted from the left and right support grooves 23*a* by relatively moving the rotary support shaft 24 with respect to the support grooves 23*a* in a radial direction. By relatively moving the rotary support shaft 24 with respect to the right and left support grooves 23*a* to extract the rotary support shaft 24, the fixing cover 22 and the main body cover 23 can be separated from each other.

As shown in FIGS. 11 to 13, a separation lock member 41 for restricting a movement of the rotary support shaft 24 within the support groove 23*a* in a radial direction of the rotary support shaft 24 may be provided at a front end of the steel, outer wall 23L of the main body cover 23. The separation lock member 41 may be provided so as to be tiltably operable in an upward and downward direction around a support shaft 42. A hook-shaped engagement portion 41*a* may be formed in a lower part of the separation lock member 41. As shown in FIGS. 11 and 12, the engagement portion 41*a* may be located below the support shaft 42, and accordingly when the support groove 23*a* is blocked by the engagement portion 41*a*, a movement of the rotary support shaft 24 within the support groove 23*a* in the radial direction may be restricted. By the restriction of the movement of the rotary support shaft 24 within the support groove 23*a* in the radial direction, the fixing cover 22 may remain to be rotatable with respect to the main body cover 23 in the upward and downward direction.

The separation lock member 41 may be biased by a torsion spring 43 toward a direction such that the engagement portion 41*a* is located in the lower side of the rotary support shaft 24 (in a clockwise direction in FIGS. 11 to 13). One end of the torsion spring 43 may be hooked by a spring engagement portion 44 provided in the outer wall 23L in a cut and raised shape. An operation portion 41*b* for rotating the separation lock member 41 in an unlock direction by pushing with a fingertip of the user may be provided at an upper part of the separation lock member 41. As shown in FIG. 13, when the operation portion 41*b* is pushed by a fingertip of the user to tilt the separation lock member 41 in the unlock direction against the torsion spring 43 (in a counterclockwise direction in FIGS. 11 to 13), the engagement portion 41*a* may be disengaged from a position where the engagement portion 41*a* blocked the support groove 23*a*.

The spring engagement portion 44 may have a function of a spring hook portion for hooking the one end of the torsion spring 43, and also may have a function of a lever stopper for restricting a tilting angle of the separation lock member 41 toward an unlocked side. The spring engagement portion 44 may restrict a tilting angle of the separation lock member 41 toward the unlocked side to a predetermined angle. As shown in FIG. 13, by tilting the separation lock member 41 to the predetermined angle, the engagement portion 41*a* of the separation lock member 41 can be completely released from the support groove 23*a*. Furthermore, it may be configured such that the main body cover 23 can be completely separated from the fixing cover 22 by rotating the fixing cover 22 with respect to the main body cover 23 in the opening direction up to the opening angle $\theta_1$.

When the separation lock member 41 is tilted to the unlock side in a condition where the main body cover 23 is rotated in an opening direction to the opening angle $\theta_1$ (about) 45° with respect to the fixing cover 22, the engagement portion 41*a* may be completely released from a position where the support groove 23 is blocked. By the engagement portion 41*a* being completely released from the support groove 23*a*, the rotary support shaft 24 may be allowed to move relatively in the radial direction (in an extraction direction) within the support groove 23*a*. When the main body cover 23 or the fixing cover 22 may be relatively moved in a direction such that the rotary support shaft 24 is released from within the support groove 23*a* in a condition that the separation lock member 41 is tilted to the unlock side, the main body cover 23 can be relatively separated from the fixing cover 22. Furthermore, when the main body cover 23 is separated from the fixing cover 22, a screw axis 9*a* of the spindle 9, an outer flange 14, and the rotary cutting blade 15 may be exposed at the side of the outer wall 23R of the main body cover 23 below an operation window 23S that is formed in a largely cut out, a half circular shape as shown in, for example, FIG. 17. Below the operation window 23S, the user can easily and rapidly perform an operation such as an exchange of the rotary cutting blade 15 etc.

In this way, only through the unlock operation of the separation lock member 41, the fixing cover may be separated from the main body cover 23. In other words, without the unlock operation of the separation lock member 41, the fixing cover and the main body cover 23 may remain in a lock condition. Because of this construction, for example, when the user carries the cutting device 2 together with the dust collection cover 20 holding the handle 6, even if the user accidentally pushes the opening stopper 40 to cause the fixing cover 22 to be rotated (downward) with respect to the main body cover 23 to some extent, the fixing cover 22 may be prevented from releasing and/or falling off from the main body cover 23.

As shown in FIGS. 1, 3, and 14 to 18, a cutting depth adjustment stopper 50 may be provided in the right inner wall 22R of the fixing cover 22 such that the depth adjustment stopper 50 may restrict a lower end position (bottom dead center) of the main body cover 23 to adjust a cutting depth of the rotary cutting blade 15 with respect to the cutting surface W of the material to be cut. Furthermore, the cutting depth adjustment stopper 50 may be provided so as to be movable within a groove 22*d* that are formed in the fixing cover 22 and between the spring holder 33 and the stepped part 22*a* of the fixing cover 22. The groove 22*d* may be formed along an arc centered on the rotary support shaft 24. As shown in FIGS. 14 to 18, the cutting depth adjustment stopper 50 may have a stopper frame 51 in a rectangular block shape and a stopper member 52 so as to be movably supported within the stopper frame 51. Furthermore, the stopper frame 51 may have a support edge part 51*a* at a rear part thereof. The support edge part 51*a* may be inserted into a support groove part 33*d* that is formed in a front surface of the spring holder 33. The support groove part 33*d* of the spring holder 33 may extend vertically along a curved front surface (a curved inner peripheral surface) of the spring holder 33. The stopper frame 51, and eventually the cutting depth adjustment stopper 50 may be movably supported within a range where the support edge part 51*a* can be moved within the support groove 33*d*. The cutting depth adjustment stopper 50 may be prevented from detaching from between the stepped part 22*a* and the spring holder 33 by positioning the support edge part 51*a* of the stopper frame 51 within the support groove part 33*d* of the spring holder 33.

The stopper member 52 may be movably supported with respect to the stopper frame 51 along a radial direction of the rotary support shaft 24. By a compression spring 53 disposed at a bottom of the stopper frame 51, the stopper member 52 may be biased in a direction such that a tip end thereof may protrude forward. Furthermore, engagement grooves 22b may be provided on a rear surface of the stepped part 22a that is to be a front wall of the groove 22d, which is located at a front side of the cutting depth adjustment stopper 50. As shown in the figures, a plurality of engagement grooves 22b may be provided along the rear part of the stepped part 22a. In the present embodiments, the plurality of the engagement grooves 22d may be formed at approximately equal intervals. When the tip end of the stopper member 52 protrudes and is inserted into one of the engaging grooves 22b by a biasing force of the compression spring 53, the cutting depth adjustment stopper 50 may be fixed so as not to be vertically moved. On the other hand, when the stopper member 52 is pushed by a fingertip of the user against the compression spring 53, the tip end of the stopper member 52 may be retreated from the one of the engagement groove 22b. By the retreat of the stopper member 52 by the user's fingertip, the stopper frame 51, and eventually the cutting depth adjustment stopper 50 can be moved in an upward and downward direction. Furthermore, after the tip end of the stopper member 52 is moved vertically at a desired position and is engaged with one of the engagement grooves 22b by the biasing force of the compression spring 53, then the cutting depth adjustment stopper 50 may be fixed at the desired position.

When the main body cover 23 is rotated downward, a stopper contact part 23b, which is to be set at a lower part of the groove 23e and also at a rear part of the operation window 23S, may be brought into contact with stopper frame 51 of the cutting depth adjustment stopper 50 to restrict a downward movable end position of the main body cover 23 (and the cutting device 2). Owing to the restriction of a downward movable end position of the cutting device 2 and eventually the rotary cutting blade 15 by the cutting depth adjustment stopper 50, a protruding depth of the rotary cutting blade 15 below the lower surface of the base 21 may be restricted. Accordingly, a cutting depth of the rotary cutting blade 15 with respect to the cutting surface W of the material to be cut may be adjusted in a stepwise manner. FIGS. 1, 3, and 14 to 18 show that the cutting depth adjustment stopper 50 is fixed at a lowest position such that the tip end of the stopper member 52 is engaged with the engagement groove 22b that is located at a lowest position. Accordingly, in FIGS. 1, 3, and 14 to 18, a downward movable end position of the main body cover 23 may be set at the lowest position, and accordingly a cutting depth of the rotary cutting blade 15 with respect to the cutting surface W of the material to be cut may be configured to be maximum. Though omitted in the figures, a scale and value corresponding to a cutting depth of the material to be cut may be indicated on each of the engagement grooves 22b.

As described above, the stopper frame 51 may have the rectangular block shape. Furthermore, an inner peripheral surface of the spring holder 33 may be curved in an arc shape centered on the rotary support shaft 24. On the other hand, when the stopper contact part 23b of the main body cover 23 is brought into contact with the upper surface of the stopper frame 51, the stopper frame 51 may be tilted in a counter-clockwise direction, with the tip end of the stopper member 52, which is engaged with the engagement groove 22b, as a supporting point. As a result of the tilt of the stopper frame 51 with the tip end of the stopper member 52 as the supporting point, which differs from the rotary support shaft 24, a rear top corner 51b of the stopper frame 51 may be brought into contact with the inner peripheral surface of the spring holder 33 in such a manner as to bite into the inner peripheral surface and to receive a weight of the main body cover 23. Because of this construction, a downward end position of the main body cover 23 can be reliably restricted, and a cutting operation can be rapidly and precisely performed with a desired cutting depth.

Adding to the above described cutting depth adjustment stopper 50, the dust collection cover 20 of the present embodiment may have a fixing stopper 60 for unrotatably fixing the fixing cover 22 with respect to the main body cover 23 at an arbitrary desired angle. Adding to the structure in which the fixing cover 22 is separated relatively from the main body cover 23 as described above, the dust collection cover 20 of the present embodiment may have the fixing stopper 60 for relatively fixing the fixing cover 22 with respect to the main body cover 23 at an arbitrary angle. In this respect, the dust collection cover 20 of the present embodiment may have a new and useful feature. As shown in FIGS. 14 to 18, the fixing stopper 60 may have a base 64, an operation member 61, and a lock pin 62. The right side outer wall 23R of the main body cover 23 may have a stepped cover part 23c that covers the stepped part 22 formed in the right side inner wall 22R of the fixing cover 22 and also may have a holder cover part 23d that covers the spring retaining portion 31 provided in the right side inner wall 22R of the fixing cover 22. The stepped cover part 23c and the holder cover part 23d may be formed to rise in a lateral direction. Furthermore, a groove 23e that is curved in an arc shape may be formed between the stepped cover part 23c and the holder cover part 23d. The groove 23e may enter into and/or fit into the groove 22d of the fixing cover 22. A lower end of the groove 23e may correspond to the stopper contact part 23b that is brought into contact with the above mentioned cutting depth adjustment stopper 50.

The fixing stopper 60 may be disposed within the groove 23e. The base 64 may be inserted to the groove 23e to be fixed (in the groove 23e). A slide groove part may be formed at a front side of the base 64. The operation member 61 may be retained so as to be vertically slidable on the base 64 in a predetermined area. Furthermore, a slide edge portion may be formed at a lateral part of the operation member 61 at a front side thereof. The slide edge portion may be entered into the slide groove part, and the operation member 61 may be slidably supported vertically with respect to the base 64 within the predetermined area. Furthermore, the operation member 61 may be biased by a compression spring 63 in a direction to slide upward. The operation member 61 may be slid toward a lower direction against the compression spring 63 by a fingertip of the user. When the operation member 61 is slid toward a lock position side (toward a lower direction), an opening/closing operation of the fixing cover 22 with respect to the main body cover 23 may be locked, and a position of the rotary cutting blade 15 may be fixed.

An operation groove 61b may be formed on a rear surface side (a lateral surface) of the operation member 61. As shown in FIGS. 14 to 18, the operation groove 61b may be formed to have a large depth at a lower part thereof and to have a smaller depth toward an upper side. A lock pin 62 may be located and/or placed facing the operation grove 61b. Furthermore, the lock pin 62 may be retained in a retaining hole 23g that is formed in the holder cover part 23d of the main body cover 23. The retaining hole 23g may be formed passing through a front wall of the holder cover part 23d. The lock pin 62 may have a larger diameter than at least a thickness of the front wall of the holder cover part 23d. Because of this construction, the lock pin 62 may protrude toward a thickness direction from the front wall part of the holder cover part 23d.

Figure 17:
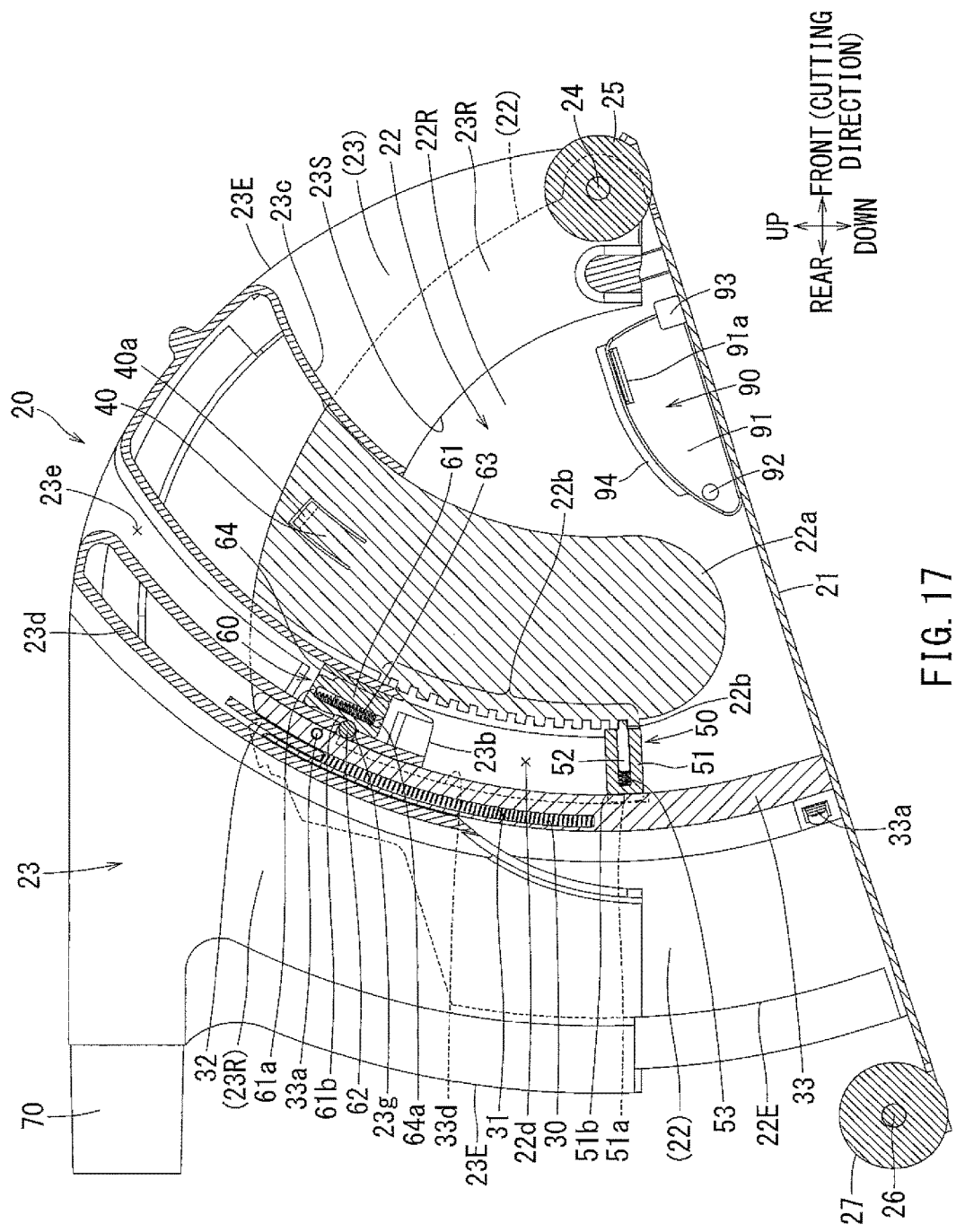
FIG. 17 is another front, and partial cut-away view of the dust collection cover with the cutting device removed for clarity, showing a state where the fixing stopper is unlocked.
Figure 18:
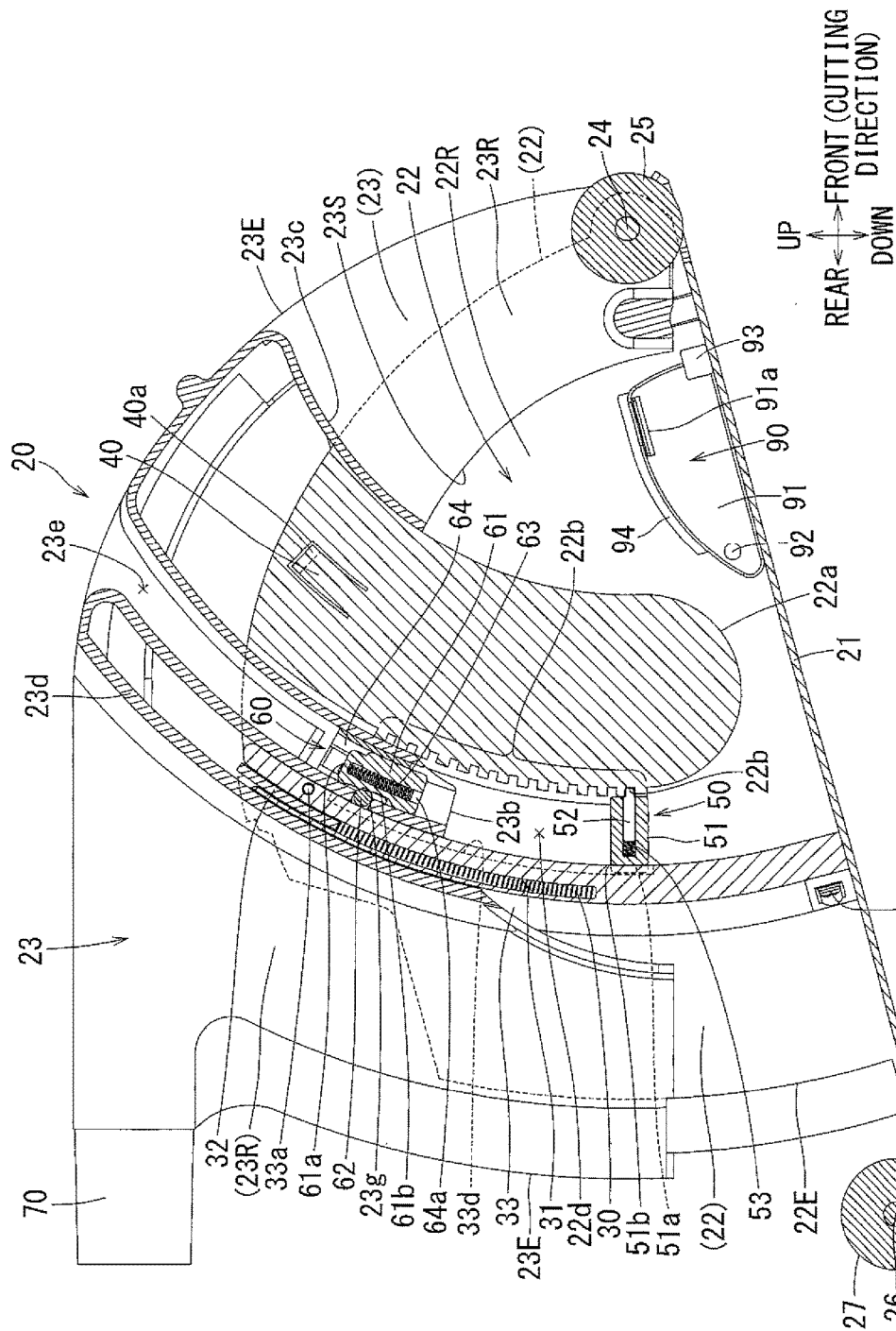
FIG. 18 is another front, and partial cut-away view of the dust collection cover with the cutting device removed for clarity, showing a state where the fixing stopper is locked.

As shown in FIG. 17, in a state where the operation member 61 is positioned in an unlock position, which is an upper position, by a biasing force of the compression spring 63, the lock pin 62 may be placed at a lower, deep position of the operation groove 61b. In other words, the lock pin 62 may enter into the lower, deep position (area) of the operation groove 61b and may not protrude to an inner side of the holder cover part 23d. On the other hand, as shown in FIG. 18, when the operation member 61 is slid to a lower position, i.e. a lock position, against the biasing force of the compression spring 63, the lock pin 62 may be placed at an upper, shallow position (area) of the operation groove 61b. Due to the shallow position (area) of the operation groove 61b, the lock pin 62 may be pushed to protrude to the inner side of the holder cover part 23d.

Regarding an arbitrary and relative rotation position (opening angle) of the main body cover 23 with respect to the fixing cover 22, when the operation member 61 is slid toward the lock position (downward direction) and the lock pin 62 is pressed by the shallow position (area) of the operation groove 61b toward the inner side of the holder cover part 23d, the lock pin 62 may be pressed toward a front surface of the spring holder 33 as shown in FIG. 18. In this way, the lock pin 62 may be strongly held between (bitten into) the operation groove 61b at the side of the main body cover 23 and the front surface of the spring holder 33 at the side of the fixing cover 22. Thus, a downward rotation of the main body cover 23, or an upward rotation of the fixing cover 22 may be restricted, and an opening angle of the main body cover 23 with respect to the fixing cover 22 may be locked at an arbitrary (desired) angle. The operation member 61 may be retained in a lock position by the lock pin 62 being bitten into the front side of the spring holder 23.

Similarly to the cutting depth adjustment stopper 50, the fixing stopper 60 may have a function of adjusting a protruding amount of the rotary cutting blade 15 below the lower surface of the base 21, i.e., the cutting surface W of the material to be cut. To be more specific, the cutting depth adjustment stopper 50 may have a function of adjusting a cutting depth in a stepwise manner, while the fixing stopper 60 may have a function of adjusting a cutting depth in an arbitrary manner, i.e. the fixing stopper 60 may fix the rotary cutting blade 15 to an arbitrary position.

A cutting depth set by the cutting depth adjustment stopper 50 may serve as an upper limit when a cutting depth of the rotary cutting blade 15 with respect to the cutting surface W of the material to be cut is gradually increased by moving the main body cover 23 during a downward direction. On the other hand, a cutting depth set by the fixing stopper 60 may be effective in a cutting mode where a predetermined protruding amount of the rotary cutting blade 15 is protruded below the lower surface of the base 21 from the beginning before a cutting operation, i.e. without a downward movement of the main body cover 23 during a cutting operation.

When the operation member 61 retained at a lock position is pushed upward, the locked state (the bitten state) of the lock pin 62 with respect to the shallow position of the operation groove 61b may be released, and the operation member 61 may be returned to an upper, unlock position by the biasing force of the compression spring 63.

A dust collection port 70 may be provided at a rear part of the main body cover 23 for connecting a dust collector CL. The dust collector CL may be connected to the dust collection port 70 through a dust collection hose H. The dusts and/or debris generated at the cutting position C may be blown up within the dust collection cover 20 by a swirling air generated by a rotation of the rotary cutting blade 15. After that, the dusts and/or debris may be collected by the dust collector CL, such that the dusts and/or debris can be prevented from being scattered around.

As shown in FIGS. 2 and 4, a rear reinforcing plate 80 may be disposed at a rear part of the fixing cover 22. The rear reinforcing plate 80 may be formed by cutting and raising a part of the base 21 formed from a steel plate. More specifically, the rear reinforcing plate 80 may be raised from a rear part of the rectangular window 21a. An upper part of the rear reinforcing plate 80 may be brought into contact with an inner surface of the inner peripheral part 22E of the fixing cover 22. The rear reinforcing plate 80 may be disposed along a rear peripheral part of the rotary cutting blade 15. By the rear reinforcing plate 80, a support rigidity of the fixing cover 22 with respect to the base 21, mainly a rear side of the base 21, may be reinforced.

As shown in FIGS. 2 and 4, a dust guide plate 81 may be disposed along a front part and an upper part of the main body cover 23. The dust guide plate 81 may be a belt-shaped steel plate having a width so as to cross the left side outer wall 23L and the right side outer wall 23R. At a front part of the dust guide plate 81, a front guide part 81a may be formed by cutting and raising a part of the dust guide plate 81. Furthermore, the front guide part 81a may be formed so as to have a width that is larger than a thickness of the rotary cutting blade 15. The front guide part 81a may be disposed so as to be raised in a curved shape in an upward direction from a vicinity of a front end part of the rectangular window 21a of the base 21, and an upper end of the front guide part 81a may be brought into contact with an inner surface of the outer peripheral part 23E of the main body cover 23. By the front guide part 81a thus cut and raised, a dust guide port 81b may be provided at a rear part thereof. Above the cutting portion C, the dust guide port 81b may be formed having a width that is larger than the thickness of the rotary cutting blade 15. An upper part of the dust guide plate 81 may be disposed approximately in parallel to the outer peripheral part 23E in an area from around an upper end part of the dust guide port 81b to a front of the dust collection port 70. Furthermore, a dust collection passage 82 may be formed between an upper side of the dust guide plate 81 and the outer peripheral part 23E.

The dusts and/or debris that are blown up from the cutting portion C may be blown to the front guide part 81a via the dust collection port 81b and lead to the dust collection passage 82. The dusts and/or debris blown in the dust collection passage 82 may be lead rearward toward the dust collection port 70. Furthermore, the dusts and/or debris that are lead to the dust collection port 70 via the dust collection passage 82 may be forced to be collected by the dust collector CL that is connected to the dust collection port 70. A part of the dusts and/or debris that fail to be collected in the dust collection passage 82 and are flown to a rear part of the fixing cover 22 may be exhausted out from the rectangular window 21a to the outside of the dust collection cover 20 (on the cutting surface W). Similar to the rear reinforcing plate 80 of the fixing cover 22, the dust guide plate 81 formed from a steel plate may serve as a reinforcing member of the main body cover 23 by the dust guide plate 81 that are held and/or sandwiched between the left outer wall 23L and the right outer wall 23R, thereby improving durability of the dust collection cover 20.

Figure 19:
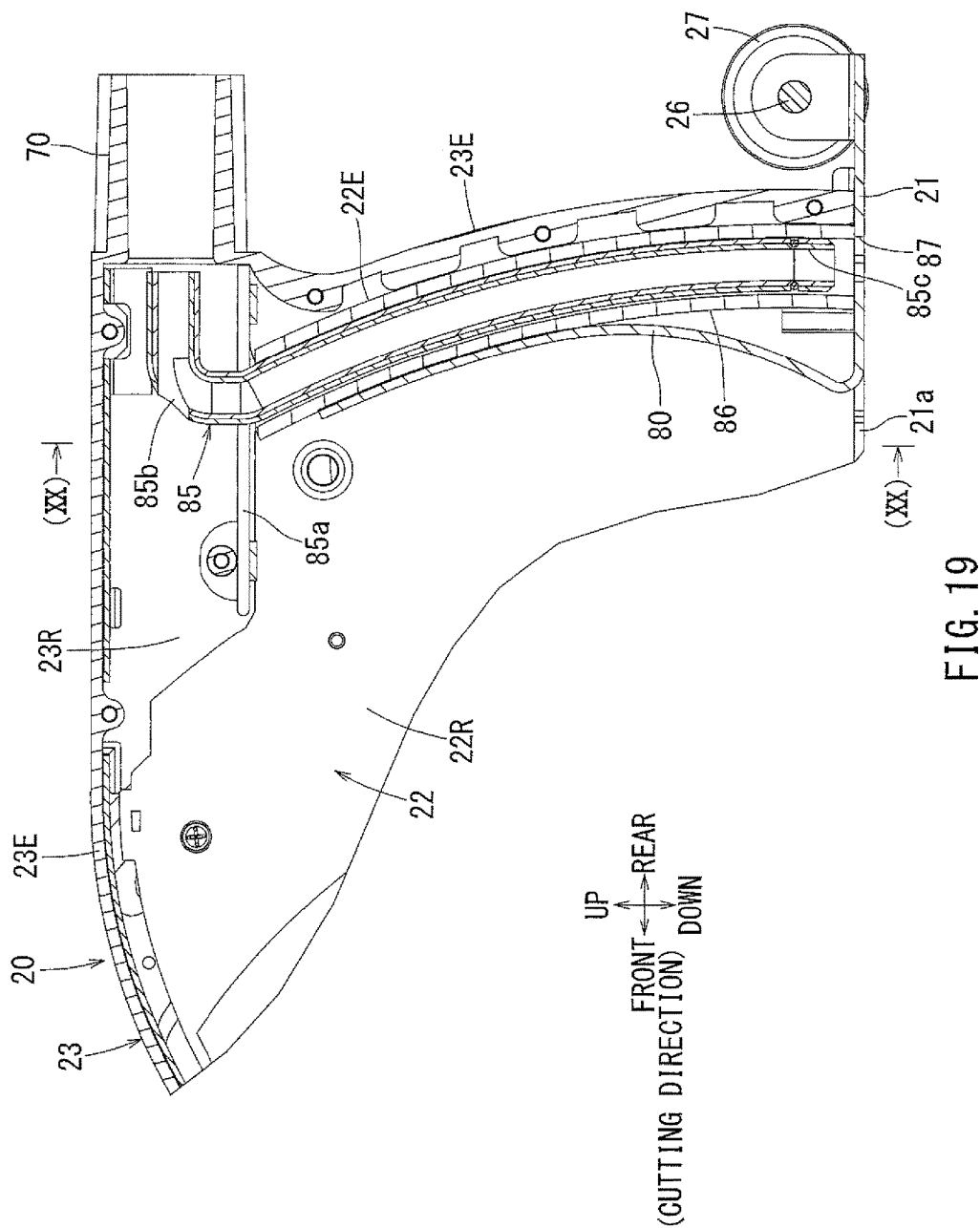
FIG. 19 is a left side view of an inner part of the main body cover, in which a front side of the main body cover is removed with for clarity.
Figure 20:
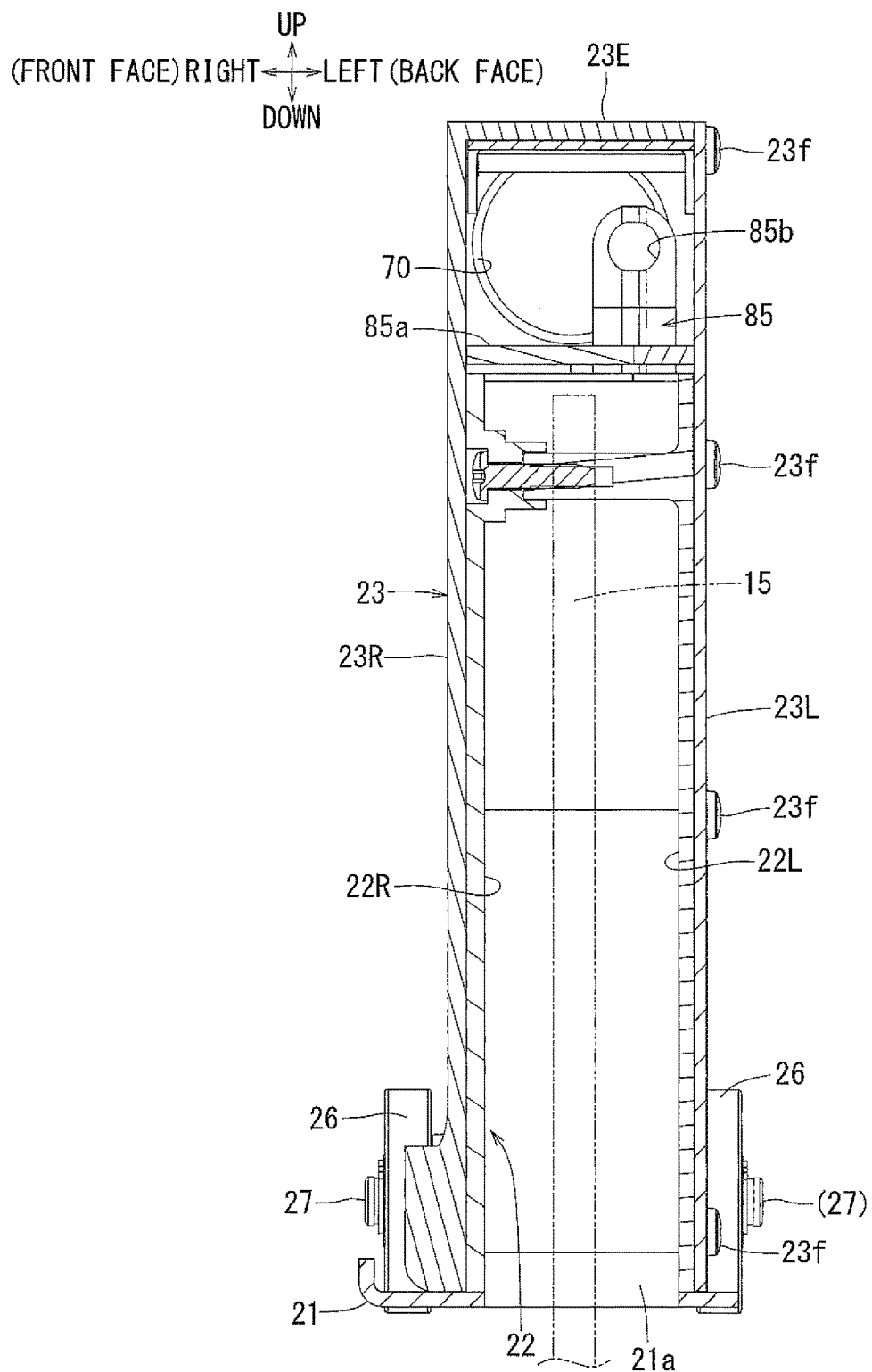
FIG. 20 is a cut-away view taken along the line (XX)-(XX) in FIG. 19.

The dusts and/or debris exhausted out through the rectangular window 21a of the base 21 or the dusts and/or debris accumulated on the cutting surface W may be collected to the dust collection port 70 by an auxiliary dust collection nozzle 85 that will be explained below. As shown in FIGS. 19 and 20, the auxiliary dust collection nozzle 85 may be disposed along a rear part of the main body cover 23. An attachment base 85a may be provided in the auxiliary dust collection nozzle 85. The attachment base 85a may be screw-fixed around the dust collection port 70 of the main body cover 23. As shown in FIG. 19, above the attachment base 85a, an upper part of the auxiliary dust collection nozzle 85 may be curved in an L-shape toward the rear dust collection port 70. A vent hole 85b may be provided at a corner of the curved part. Furthermore, a tip end of the curved part of the auxiliary dust collection nozzle 85 may be directed to the dust collection port 70.

As shown in FIG. 19, a lower part of the auxiliary dust collection nozzle 85 below the attachment base 85a may extend downward in a curved shape. Furthermore, the lower part of the auxiliary dust collection nozzle 85 below the attachment base 85a may be inserted into a tubular nozzle guide 86 that is located at a reap part of the fixing cover 22. The nozzle guide 86 may be disposed along the inner peripheral part 22E of the fixing cover 22. Furthermore, the nozzle guide 86 may be disposed along an arc that has the same curvature as in the auxiliary dust collection nozzle 85 of the fixing cover 22. Because of this construction, when the main body cover 23 is rotated in an upward and downward direction with respect to the fixing cover 22, the lower curved part of the auxiliary dust collection nozzle 85 below the attachment base 85a may be moved in the upward and downward direction within the nozzle guide 86. As shown in FIG. 19, when the main body cover 23 is moved to a downward end position, a lower end part (auxiliary dust collection port 85c) of the auxiliary dust collection nozzle 85 may be disposed just over an auxiliary dust collection hole 87 that is provided in the base 21.

During a cutting operation, the dusts and/or debris blown up from the cutting portion C may be lead to the dust collection port 70 through the dust collection passage 82 to be collected by a suction force (dust collection power) of the dust collector CL in a forced manner. A part of the dusts and/or debris that have failed to be collected through the dust collection passage 82 may be flown in a rear direction and exhausted out on the cutting surface W through the rectangular window 21a. The exhausted dusts and/or debris and/or the accumulated dusts and/or debris on the cutting surface W may be collected by the auxiliary dust collection nozzle 85 through the auxiliary dust collection hole 87. The suction force of the dust collector CL that is connected to the dust collection port 70 may be applied to the auxiliary dust collection nozzle 85 through the vent hole 85b provided at the curved corner of the auxiliary dust collection nozzle 85. The dusts and/or debris on the cutting surface W may be collected by the suction force applied to the auxiliary dust collection nozzle 85. The dusts and/or debris collected by the auxiliary dust collection nozzle 85 may be further collected by the dust collector CL through the dust collection port 70 in a forced manner.

As shown in FIGS. 1, 3, 15 to 18, at a lateral side of the cutting portion C, a view window 90 for viewing and/or looking into the cutting portion C may be provided at a lower portion of the right side inner wall 21R of the fixing cover 22. The view window 90 may be provided by cutting a lower part of the right side inner wall 21R of the fixing cover 22 such that a user can easily view and/or look into the cutting portion C to ensure that the rotary cutting blade 15 is aligned and cutting along a desired cutting path. The view window 90 may be covered with a transparent cover 91 through which the user can view and/or look into the cutting portion C. The transparent cover 91 may be formed from a transparent resin. Furthermore, the transparent cover 91 may be supported so as to be rotated in an upward and downward direction via a support shaft 92 with respect to the inner wall 21R. At an upper part of the transparent cover 91, a knob 91a may be provided such that a user can hold and/or pinch it by his or her fingertips to rotate the transparent cover 91 in the upward and downward direction.

As shown in FIG. 1, a cover engagement portion 93 for retaining the transparent cover 91 in a closed position may be provided at a front part of the view window 90. Furthermore, a dust removal member 94 for removing the dusts and/or debris attached and/or stuck to an inner surface of the transparent cover 91 may be provided just above the view window 90. The dust removal member 94 may be made of, for example, felt. The dust removal member 94 may be attached and elongated along above the view window 90 in a forward and rearward direction. By viewing and/or looking into the cutting portion C through the transparent cover 91, the user can precisely position a cutting edge of the rotary cutting blade 15 to the cutting portion C (marking line) of the cutting surface W, and eventually a cutting operation can be precisely and rapidly performed.

When the dusts and/or debris generated in the cutting portion C are attached and/or stuck to the inner surface of the transparent cover 91, which may cause to deteriorate the visibility, the user may hold the knob 91a and rotate to open the transparent cover 91 in an upward direction to view and/or look into the cutting portion C. When the transparent cover 91 is opened upward, the dust removal member 94 may be brought into contact with the inner surface of the transparent cover 91 to remove the dusts and/or debris attached and/or stuck to the inner surface. By moving the transparent cover 91 in an upward and downward direction several times, the dusts and/or debris attached and/or stuck to the inner surface can be almost completely removed. In this way, the dust removal member 94 may serve as a wiper device for removing the dusts and/or debris attached and/or stuck to the inner surface of the transparent cover 91. When the opened transparent cover 91 is rotated downward to close, a front part of the transparent cover 91 may be engaged again with the cover engagement portion 93 to retain in a closed position. When the transparent cover 91 is closed, a space between the transparent cover and the inner wall 22R may be blocked by the dust removal member 94, thereby preventing the dusts and/or debris generated in the cutting portion C from scattering around.

In this way, by opening the transparent cover 91 upward, the dusts and/or debris attached and/or stuck to the inner surface of the transparent cover 91 may be removed by the dust removal member 94. Because of this construction, without removing the transparent cover 91 from the fixing cover 22, which may be awkward and troublesome for the user, only by stopping the rotary cutting blade 15 temporarily and moving the transparent cover 91 in an upward and downward direction, the once deteriorated visibility of the cutting portion C may be improved, thereby allowing the user to restart the cutting operation. In this respect, usability of the dust collection cover 20, and eventually operability in performing a cutting operation can be improved.

According to the dust collection cover 20 of the present embodiments thus constructed, the main body cover 23 and the fixing cover 22 may be separated with each other by an unlock operation of the separation lock member 41. In other words, unless an unlock operation of the separation lock member 41 is performed, the main body cover 23 and the fixing cover 22 cannot be separated with each other. Because of this construction, for example, when the dust collection cover 20 is carried, the main body cover 23 and the fixing cover 22 may not be accidentally separated from each other. Furthermore, by an unlock operation of the separation lock member 41, the fixing cover 22 may be separated from the main body cover 23. Accordingly, an attachment/detachment operation of the rotary cutting blade 15 can be easily and rapidly performed.

Furthermore, according to the dust collection cover 20 thus exemplified, an opening stopper 40 for restricting a rotation of the main body cover 23 with respect to the fixing cover 22 in the opening direction may be formed in the fixing cover 22 such that the opening stopper 40 may be located between the fixing cover 22 and the main body cover 23. According to the opening stopper 40, regarding an opening angle of the main body cover 23 with respect to the fixing cover 22, a rotation movement in an opening direction may be restricted at an opening angle (opening restriction angle $\theta_0$) that is smaller than the opening angle $\theta_1$. Because of this construction, in order to separate the main body cover 23 from the fixing cover 22 by an unlock operation of the separation lock member 41, an unlock operation of the opening stopper 40 may have to be performed. In this respect, the main body cover 23 may be effectively prevented from being accidentally separated from the fixing cover 22.

Furthermore, according to the dust collection cover 20 thus exemplified, it may be configured such that the axle that may support the left and right front wheels 25 may be utilized as the rotary support shaft 24 for rotatably supporting the main body cover 23 and the fixing cover 22. Furthermore, it may be configured such that the rotary support shaft 24 may be inserted into the support groove 23*a* to rotatably support the main body cover 23 with respect to the fixing cover 22. Because of this construction, a configuration around the front part of the dust collection cover 20 for rotatably and separably supporting the main body cover 23 and the fixing cover 22 may be simplified, thereby improving usability of the dust collection cover 20.

Furthermore, the separation lock member 41 may be biased in a lock side by the compression spring 43. Because of this construction, when an operation to an unlock side is released, the separation lock member 41 may be automatically returned to the lock side by the biasing force of the compression spring 43. According to the automatically-returned type separation lock member 41, an accidental rotation of the separation lock member 41 toward the unlock side owing to, for example, vibration etc., may be effectively prevented, thereby preventing an accidental separation of the main body cover 23 and the fixing cover 22 from each other. Furthermore, the separation lock member 41 may be biased to the lock side, and accordingly when an operation to the unlock side is released, the separation lock member 41 may be automatically returned to the lock side, which means that an operation of the separation lock member 41 toward the lock side may not be forgotten. In this respect, the main body 23 can be prevented from being accidentally separated from the fixing cover 22.

The present invention is not limited to the above-described embodiments and may be further modified without departing from the scope and spirit of the present teachings. For example, the opening stopper 40 may be omitted. An accidental separation of the main body cover 23 from the fixing cover 22 may be prevented only by the separation lock member 41.

Furthermore, by modifying a tiltable angle of the separation lock member 41 toward the unlock side, a retreat amount of the engagement portion 41*a* with respect to the support groove 23*a* may be changed. Accordingly the exemplified opening angle $\theta_1$ approximately) 45° may be changed to, for example, a larger angle than $\theta_1$.

Furthermore, in the above-described embodiments, the separation lock member 41 may be biased to the lock side by the compression spring 43. However, it may be configured such that the compression spring 43 may be omitted and an engagement protrusion may be provided in the outer wall 23L of the main body cover 23, thereby retaining the separation lock member in a lock position or an unlock position.

Furthermore, in the above-described embodiments, the axle that support the front wheel 25 may be utilized as the rotary support shaft 24 that rotatably supports the fixing cover 22 and the main body cover 23. However, it may be configured such that the rotary support shaft and the axle may be a separate member.

Figure 21:
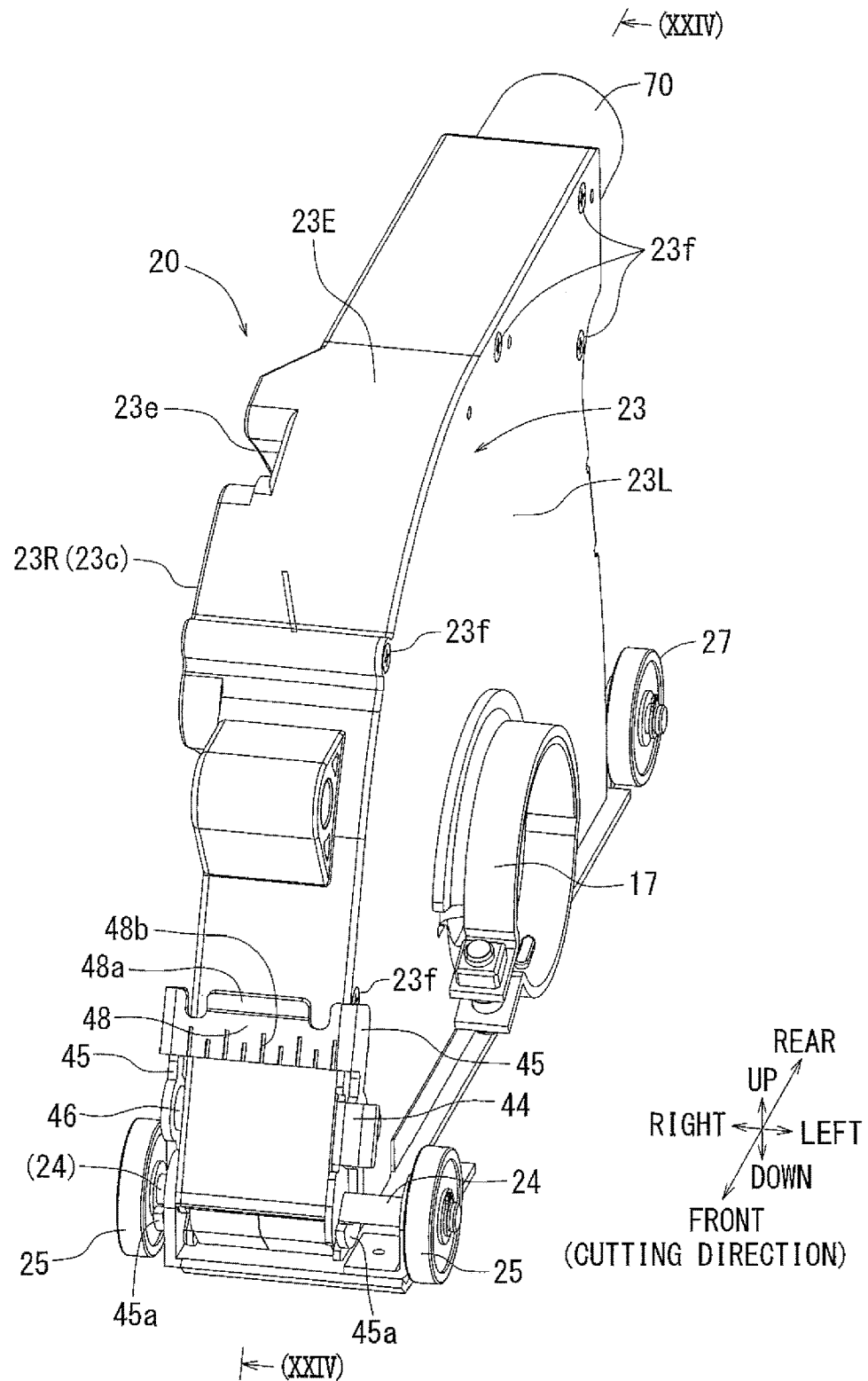
FIG. 21 is a perspective view of a dust collection cover with a separation lock member according to another exemplary embodiment of the present disclosure, with the cutting device removed from clarity.
Figure 22:
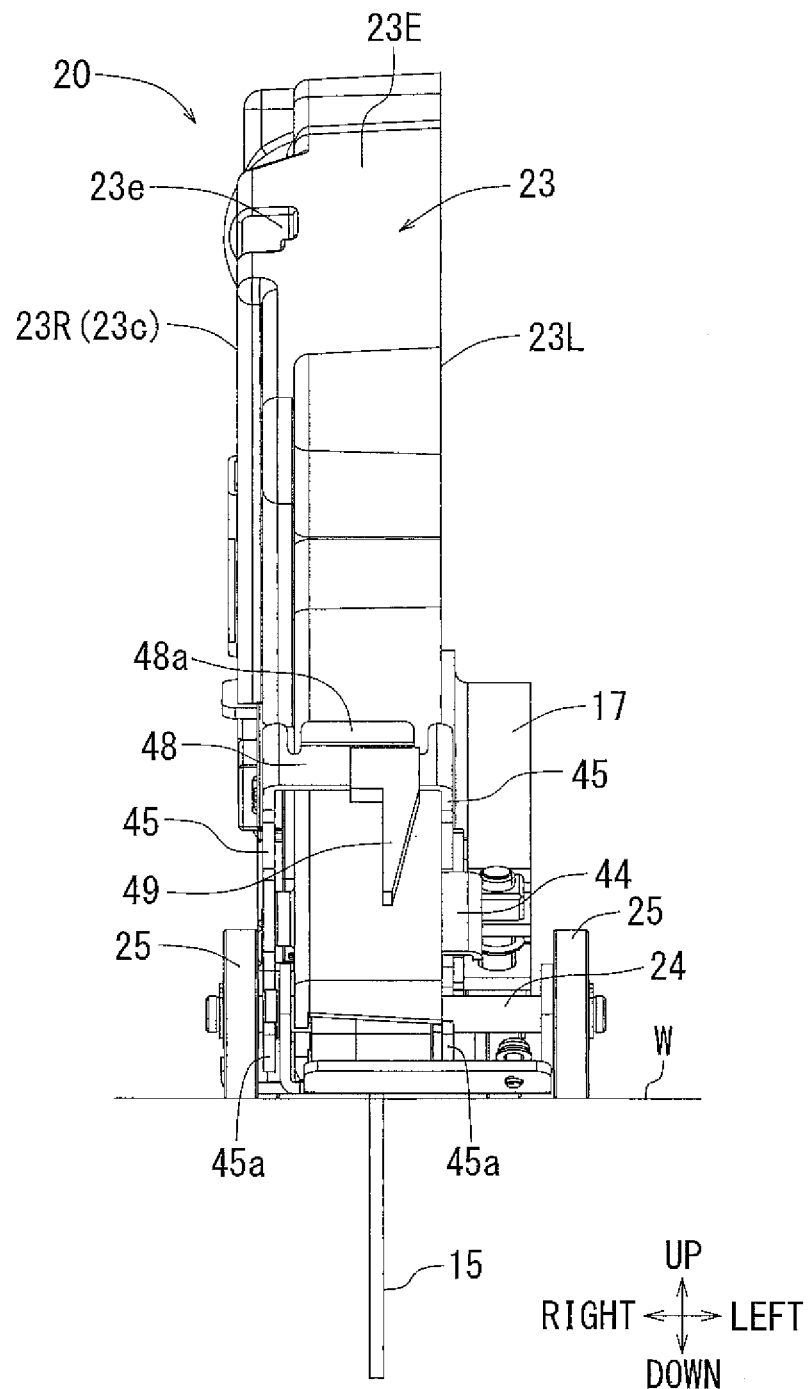
FIG. 22 is a view of the dust collection cover with a separation lock member viewed from a front side, according to another exemplary embodiment.
Figure 23:
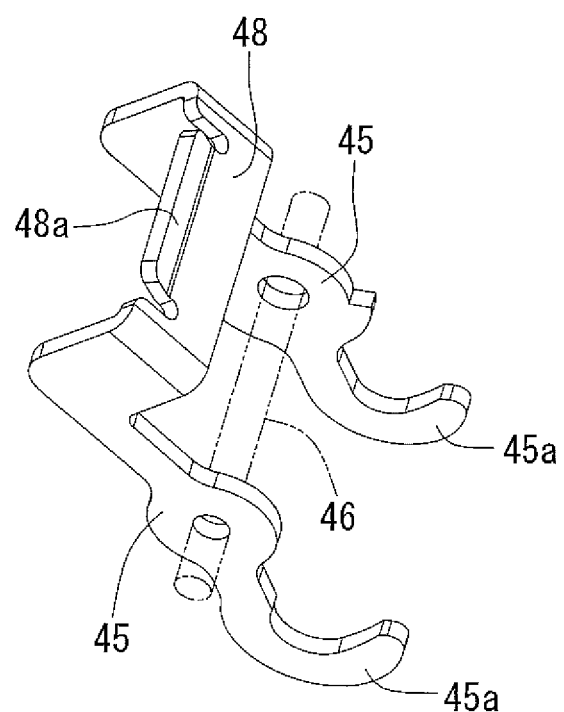
FIG. 23 is a perspective view of separation lock members according to another exemplary embodiment.

Furthermore, in the above-described embodiments, one separation lock member 41 may be arranged on the left side of the main body cover 23. However, as shown in, for example, FIGS. 21 to 23, separation lock members 45 may be arranged both on the left and right sides of the main body cover 23. FIGS. 21 and 22 show the dust collection cover 20 having two lock members 45, i.e., the left separation lock member 45 and the right separation lock member 45, according to another embodiment. Explanations about members and configurations that may be the same as in the above-described embodiment and not be necessary to modify will be omitted, assigning the same component numbers. The left and right separation lock members 45 may be supported so as to be tiltable in the forward and rearward direction at around a front end side of the main body cover 23 via a common support shaft 46, as in the first embodiment. FIG. 23 shows only the separation lock members 45, which are removed from the main body cover 23. Each of the separation lock members 45 may have a hook-shaped engagement portion 45*a* at the end thereof in the same manner of the first embodiment.

As shown in FIG. 23, a pair of the separation lock members 45 may be integrally joined by a connection portion 48. The connection portion 48 may be disposed along a front surface of the main body cover 23 extending between the separation lock members 45. Because of this construction, the left and right separation lock members 45 may be integrally tilted in the forward and rearward direction. On the upper part of the connection portion 48, an operation portion 48*a* may be provided so as to be inclined forward.

Each of the separation lock members 45 may be biased to a lock side by a torsion spring attached around the support shaft 46. The torsion spring of this embodiment may correspond to the torsion spring 43 of the first embodiment and not shown in FIGS. 21 and 22. When both the separation lock members 45 are in a locked state by the torsion spring, each of the engagement portion 45*a* of the separation lock members 45 may be engaged with the rotary support shaft 24 and a relative movement of the rotary support shaft 24 within the support grooves 23*a* in a radial direction may be restricted. Accordingly, the main body cover 23 may not be separated from the fixing cover 22, which means that the main body cover 23 is in a locked state. A rotation end position of the separation lock members 45 in an unlocked state may be restricted by the spring engagement portion 44 provided around the left separation lock member 45, in the same way as the separation lock member 41 of the first embodiment.

A user can operate to tilt both the separation lock member 45 to an unlock side against the torsion spring through the operation portion 48a of the connection portion 48. When both the separation lock members 45 are operated to tilt to the unlock side, both the engagement portion 45a may be extracted from the lower part of the rotary support shaft 24 and may be allowed to move within the support grooves 23a of the rotary support shaft 24 in a radial direction. Accordingly, the main body cover 23 can be separated from the fixing cover 22.

As shown in FIG. 21, on the front surface of the connection portion 48, a scale 48b may be provided that shows a position of the rotary cutting blade 15 in the thickness direction thereof (the left and right direction). In other word, the scale 48b may indicate a position of the cutting edge of the rotary cutting blade 15. Furthermore, as shown in FIG. 22, an indicator 49 may be attached to the connection portion 48. The indicator 49 may be attached to the connection portion 48 so as to be adjustable in the thickness direction (left and right direction) of the rotary cutting blade 15. In other word, the indicator 49 can be positioned according to a thickness of the rotary cutting blade 15 and/or a change of an attachment position of the rotary cutting blade 15 that is attached to the spindle 9. The indicator 49 may be rapidly and precisely positioned by use of the scale 48b. In this way, the indicator 49 may be positioned with respect to the rotary cutting blade 15 in advance, and the dust collection cover 20 and eventually the cutting device 2 may be positioned such that the indicator 49 may be positioned in align with a marking line that is drawn on a cutting surface W of the material to be cut. Accordingly, the rotary cutting blade 15 can be precisely positioned to a marking line, and thus a cutting work can be precisely and easily performed.

Furthermore, according to the pair of the separation lock members 45 thus constructed, each of the engagement portion 45a may be engaged with the rotary support shaft 24, and accordingly the engagement portions 45a can be furthermore firmly restricted from moving in the radial direction within the support grooves 23a. Because of this, the main body cover 23 can be furthermore firmly connected to the fixing cover 22 and inadvertent separation of the main body cover 23 from the fixing cover can be surely and more reliably prevented.

Furthermore, the pair of the separation lock members 45 can be integrally operated to move through the operation portion 48a of the connection portion 48. Furthermore, the connection portion 48 may include the indicator 49 for indicating a position of the rotary cutting blade 15. By positioning the rotary cutting blade with respect to a marking line utilizing the indicator 49, a cutting work can be precisely and rapidly performed.

Figure 24:
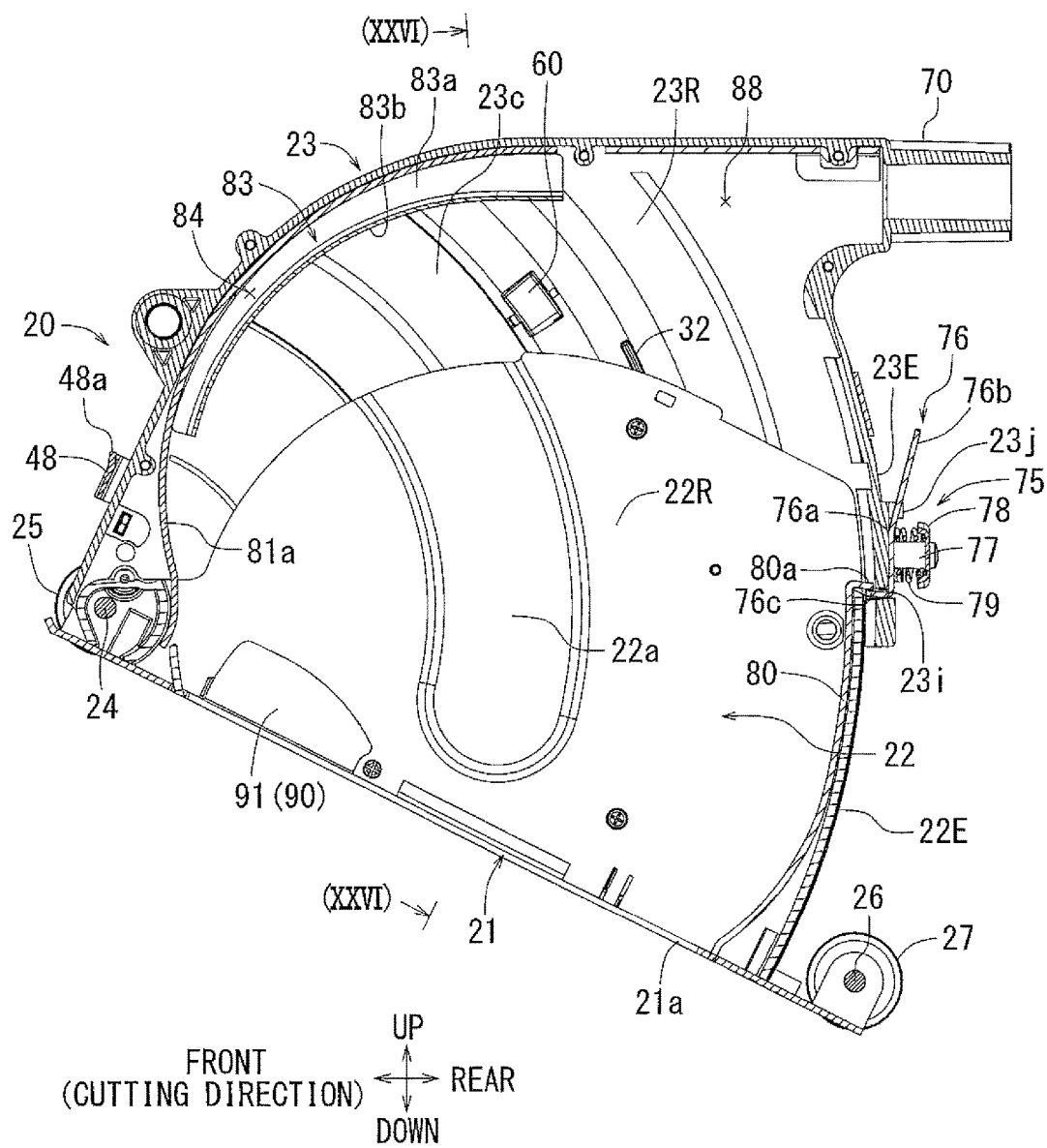
FIG. 24 is a cut-away view of the dust collection cover with an opening stopper according to another exemplary embodiment, taken along the line (XXIV)-(XXIV) in FIG. 21, showing that a main body cover is opened to an opening restriction angle $\theta_0$.
Figure 25:
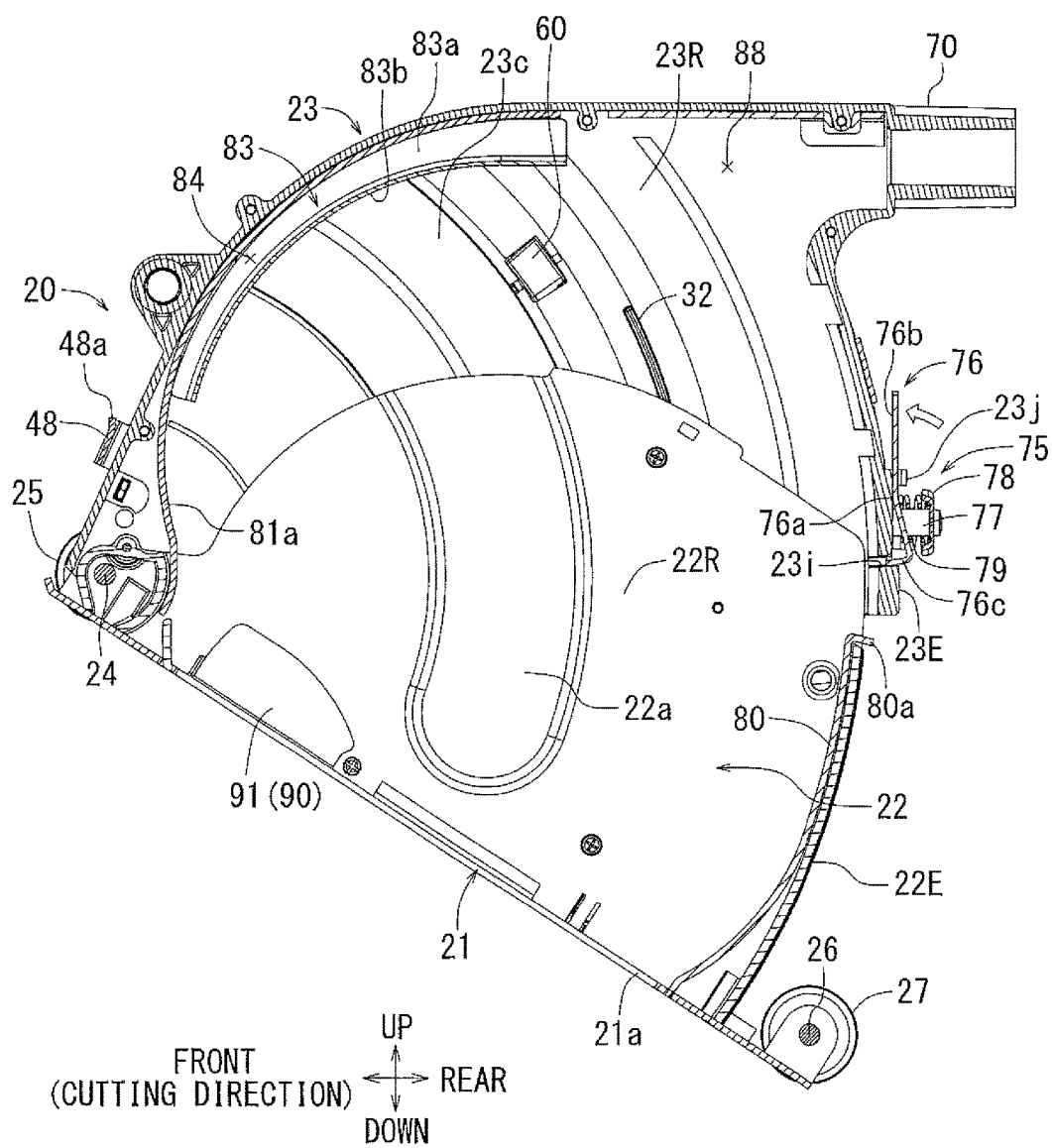
FIG. 25 is a cut-away view of the dust collection cover with an opening stopper according to another exemplary embodiment, taken along the line (XXIV)-(XXIV) in FIG. 21, showing that a main body cover is opened beyond an opening restriction angle $\theta_0$.

FIGS. 24 and 25 show an opening stopper 75 according to another embodiment, which may be a modified opening stopper 40 of the first embodiment. The opening stopper 40, which may be exemplified in the first embodiment, may be formed in a cut and raised shape on the right side of the fixing cover 22 when the fixing cover 22 is formed, and it may be configured such that by engaging the engaging claw 40a provided at the tip end thereof with an engagement portion of the main body cover 23, the fixing cover 22 may be restricted from rotating with respect to the main body cover 23 beyond the opening restriction angle $\theta_0$. The opening stopper 40 according to the first embodiment may be provided on the right side of the fixing cover 22, while the opening stopper 75 according to another embodiment may be provided at a rear part of the main body cover 23 as described below.

As shown in FIGS. 24 and 25, the opening stopper 75 according to another embodiment may be provided with a stopper lever 76 that is a band shaped steel plate. As shown in the figures, the stopper lever 76 may be inclined at a gentle angle in a mountain shape and include a supporting point 76a nearly at the center in the longitudinal direction thereof. Furthermore, an operation portion 76b may be provided at an upper side of the supporting point 76a, and an engagement portion 76c may be provided so as to be curved in an L-shape at a lower side of the supporting point 76a. A supporting column 77 may be inserted at a lower side of the supporting point 76a. Furthermore, the supporting column 77 may be fixed to a rear surface of the main body cover (outer peripheral part 23E) protruding rearward. A flange 78 may be fixed to a rear part of the supporting column 77. A compression spring 79 may be interposed between the flange 78 and the stopper lever 76 around the supporting column 77. By a biasing force of the compression spring 79, the stopper lever 76 may be biased in a direction in which a flat area of the stopper lever 76 below the supporting point 76a is pressed toward the rear part of the main body cover 23 (a lock side), as shown in FIG. 24.

As shown in FIGS. 24 and 25, the engagement portion 76c of the stopper lever 76 may be inserted within a groove hole 23i provided on the rear surface of the main body cover 23. Furthermore, the operation portion 76b may be inserted through an inner circumference side of a retention portion 23j provided on the rear surface of the main body cover 23. Because of this construction, the stopper lever 76 may be prevented from rotating around the supporting column 77 and retained in a direction to extend in an upward and downward direction along the rear surface of the main body cover 23.

As shown in FIG. 24, when in a lock state in which a part of the stopper lever 76 between the supporting point 76a and the engagement portion 76c is pressed toward the rear surface of the main body cover 23 by a biasing force of the compression spring 79, the engagement portion 76c may be protruded toward an inner side of the main body cover 23 through the groove hole 23i. On the other hand, as shown in FIG. 25, when the operation portion 76b is operated to push against the biasing force of the compression spring 79, the stopper lever 76 may be tilted (to an unlock side) in the counterclockwise direction about the supporting point 76a serving as a fulcrum. When the stopper lever 76 is tilted to the unlock side, the engagement portion 76c may be moved to extract from the groove hole 23i and eventually to extract from the inner surface side of the main body cover 23.

As clearly shown in FIG. 25, an engagement claw portion 80a may be provided in an upper part of the rear surface side (inner peripheral part 22E) of the fixing cover 22. The engagement claw portion 80a may be formed such that an upper part of the rear reinforcing plate 80 made of metal is bent, slightly protruding rearward. As shown in FIG. 24, when the main body cover 23 is rotated in an opening direction in a state in which the stopper lever 76 is positioned in the lock position by the biasing force of the compression spring 79, the engagement portion 76c may be engaged with the engagement claw portion 80a and the main body cover 23 may be restricted from further rotating in an opening direction. An opening angle of the main body cover 23 that is restricted from rotating by the engagement portion 76c of the stopper lever 76 being engaged with the engagement claw portion 80a may be set to the same opening restriction angle $\theta_0$ as in the first embodiment.

When the main body cover 23 is opened to the opening restriction angle $\theta_0$ with respect to the fixing cover 22 and the operation portion 76b is operated to push against the compression spring 79 to unlock the stopper lever 76, the engagement portion 76c may be disengaged from the engagement claw portion 80a. Then, the main body cover 23 may be opened to a larger opening angle beyond the opening restriction angle $\theta_0$ with respect to fixing cover 22. In this way, by operating to unlock the stopper lever 76, the main body cover 23 may be opened to the opening angle $\theta_1$ with respect to fixing cover 22.

According to another embodiment thus constructed, the opening stopper 75 may be positioned farthest from the rotary support shaft 24 that rotatably supports the fixing cover 22 with respect to the main body cover 23, and the engagement portion 76c may be engaged with the engagement claw portion 80a to restrict an opening angle of the main body cover 23 between the rear part of the main body cover 23 and the rear part of the fixing cover 22. Accordingly, by use of the opening stopper 75 of another embodiment thus constructed, the opening angle can be more reliably restricted compared to the opening stopper 40 of the first embodiment.

Furthermore, both the engagement claw portion 80a and the engagement portion 76c, which are engaged with each other, may be made of steel. Thus, deflection (elastic deformation) of the opening stopper 75 may be small, compared to that of the opening stopper 40 made of resin. In this respect, by use of the opening stopper 75, the opening angle can be more reliably restricted compared to the opening stopper 40. Furthermore, the opening stopper 75 may be provided nearly at the center of the dust collection cover 20 in the thickness direction thereof. Thus, compared to the opening stopper 40 that is provided only on the right side of the dust collection cover 20, the opening angle can be more reliably restricted by use of the opening stopper 75.

Figure 26:
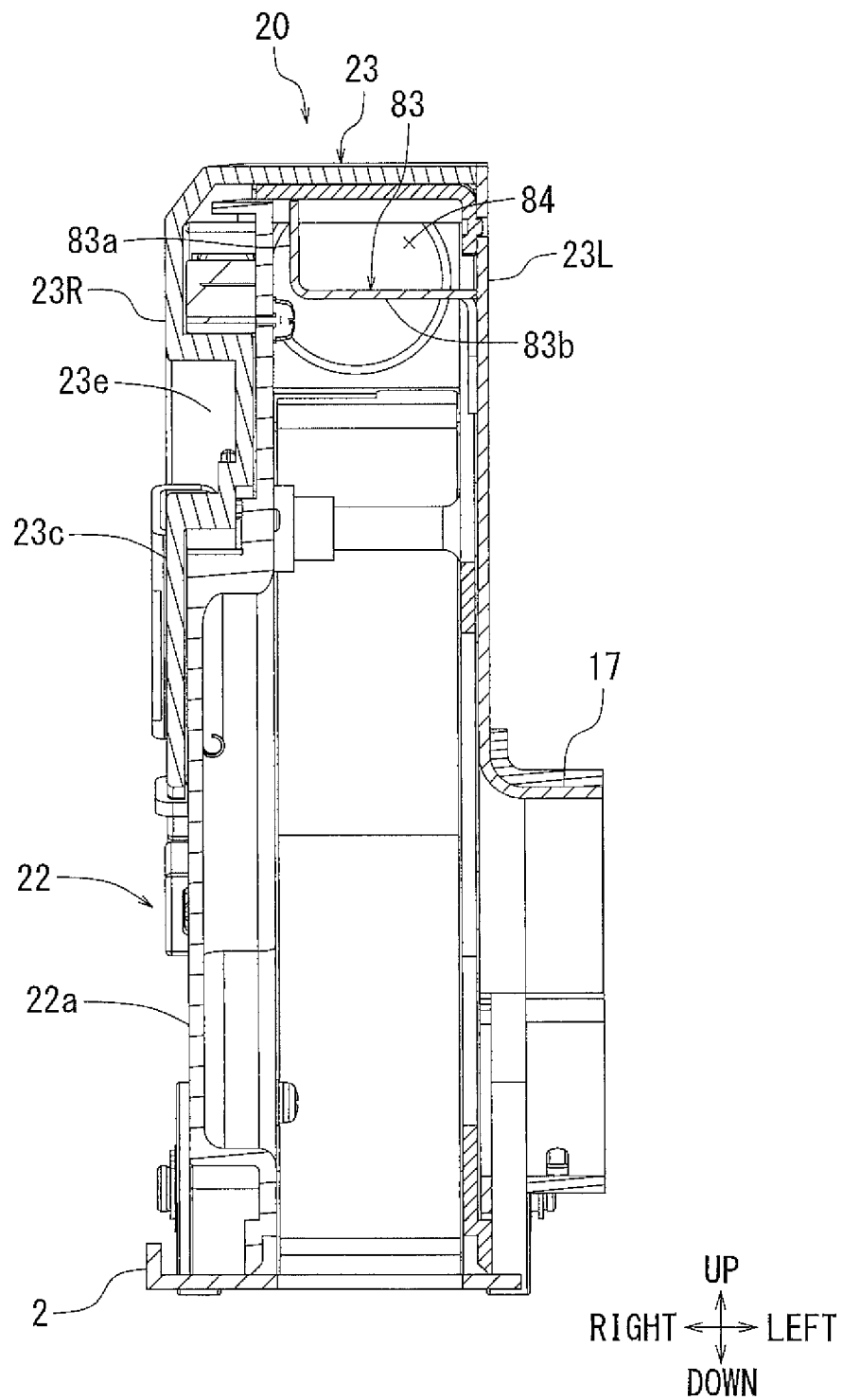
FIG. 26 is a cut-away view of the dust collection cover with a dust collection passage according to another exemplary embodiment, taken along the line (XXVI)-(XXVI) in FIG. 24.

Next, FIGS. 24 to 26 show a dust guide plate 83 according to another embodiment, which is a modified one of the dust collection plate 81 according to the first embodiment. The dust guide plate 81 of the first embodiment may have an L shape in cross section, which includes a bottom wall and a side wall (the left side outer wall 23L) located along a left side of the bottom wall, while the dust guide plate 83 of another embodiment may have an L shape in cross section, which includes a bottom wall 83b and a right side wall 83a located along a right side of the bottom wall 83b. The dust guide plate 83 having the right side wall 83a may be provided along an inside of the outer peripheral part 23E of the main body cover 23. Because of this construction, as shown in FIG. 26, the right side wall 83a that is located on the right side of the dust guide plate 83 may be disposed along the right side outer wall 23R of the main body cover 23. A dust collection passage 84 may be formed by the dust guide plate 83. The dust collection passage 84 of another embodiment may be partitioned by the dust guide plate 83 on the bottom side and the right side thereof, by the left side outer wall 23L on the left side thereof, and by the outer peripheral part 23E of the main body cover 23 on the upper side thereof.

As described above, different from the dust collection passage 82 of the first embodiment, the dust collection passage 84 may also be partitioned by the right side wall 83a, with regard to the right side of the dust collection passage 84. Accordingly, the dust collection passage 84 may be blocked by (and/or may not be communicated with) projections and recesses such as the stepped cover part 23c, the holder cover part 23d, and the groove 23e provided on the right outer wall 23R of the main body cover 23. Because of this construction, dust and/or debris that are blown up from the cutting position C and enter into the dust collection passage 84 may not be blown to the projections and recesses that might block a flow in the rearward direction.

As shown in FIGS. 24 and 25, a rear part of the dust guide 83 of another embodiment may not lead to the dust collection port 70, similar to that of the dust guide 81 of the first embodiment. Because of this construction, there may be a space 88 in which the dust collection passage 84 does not extend between the rear part of the dust guide plate 83 and the dust collection port 70. Even when the main body cover 23 is moved downward with respect to the fixing cover 22 to set the cutting depth of the rotary cutting blade 15 to the maximum, a rear part of the dust guide plate 81 and an upper part of the inner peripheral part 22E may be configured to obtain an appropriate opening space 88. Dusts and/or debris, which are produced near the cutting position C and not entered to the dust collection passage 84 and flown rearward by a rotating wind caused by the rotary cutting blade 15, may be collected to the dust collection port 70 through the space 88.

What is claimed is:

1. A cover for a cutting device, the cover being configured to cover around a rotary cutting blade of the cutting device and to collect dust, the cover comprising:
   a first cover configured to be attached to the cutting device;
   a second cover having a base with which a cutting surface of a material to be cut is brought into contact; and
   a lock member provided in the first cover, wherein:
   the first cover is configured to be coupled to the second cover such that the first cover is relatively opened and closed with respect to the second cover around a rotation support shaft,
   the second cover is disposed directly on an outside of the cutting blade, the second cover being configured to cover an outer periphery of the cutting blade,
   the first cover is disposed on an outside of the second cover in an overlapping manner in a direction extending along a plane of the blade,
   a support groove through which the rotation support shaft is inserted is provided on the first cover,
   by rotating the lock member to unlock the lock member such that an end part of the support groove is opened and the rotation support shaft is capable of being released from the support groove, the first cover and the second cover are configured to be separable from each other, and
   by rotating the lock member to lock the lock member, the first cover and the second cover are supported so as not to be separable from each other by preventing the rotation support shaft from releasing from the support groove with the support groove being covered by the lock member.

2. The cover according to claim 1, wherein,
   an opening stopper is provided in at least either one of the first cover and the second cover such that a rotation of the first cover in an opening direction is restricted with respect to the second cover.

3. The cover according to claim 1, further comprising an additional lock member,
   wherein the lock member and the additional lock member are respectively provided on a left side and a right side of the first cover, the lock member and the additional lock member being coupled together.

4. The cover according to claim 3, wherein,
   an indicator that indicates a position of the rotary cutting blade is adjustably positioned in a connection portion that connects the left and right side lock members in a thickness direction of the rotary cutting blade.

5. The cover according to claim 1, wherein,
the lock member is spring biased in a lock side where the first cover and the second cover are supported so as not to be extendable relative to each other.

6. A cutting device having the cover according to claim 1.

7. A cover for a cutting device, the cover being configured to cover around a rotary cutting blade of the cutting device and to collect dust, the cover comprising:
   a first cover configured to be attached to the cutting device;
   a second cover having a base with which a cutting surface of a material to be cut is brought into contact; and
   a lock member provided in the first cover, wherein:
   the first cover is configured to be coupled to the second cover such that the first cover is relatively opened and closed with respect to the second cover around a rotation support shaft,
   the second cover is disposed directly on an outside of the cutting blade, the second cover being configured to cover an outer periphery of the cutting blade,
   the first cover is disposed on an outside of the second cover in an overlapping manner in a direction extending along a plane of the blade,
   an opening stopper is provided in the second cover such that a rotation of the first cover in an opening direction is restricted with respect to the second cover, and a support groove member through which the rotation support shaft is inserted is provided on the first cover,
   the first cover and the second cover are extendable from each other by releasing the opening stopper such that the second cover is rotated with respect to the first cover to a larger opening angle than in a case where the opening stopper is not released, and
   by rotating the lock member to unlock the lock member such that an end part of the support groove is opened and the rotation support shaft is capable of being released from the support groove, the first cover and the second cover are configured to be separable from each other, and
   by rotating the lock member to lock the lock member, the first cover and the second cover are supported so as not be separable from each other by preventing the rotation support shaft from releasing from the support groove with the support groove being covered by the lock member.

8. The cover according to claim 7, further comprising an additional lock member,
   wherein the lock member and the additional lock member are respectively provided on a left side and a right side of the first cover, the lock member and the additional lock member being coupled together.

9. The cover according to claim 8, wherein,
an indicator that indicates a position of the rotary cutting blade is adjustably positioned in a connection portion that connects the left side and right side lock members in a thickness direction of the rotary cutting blade.

10. The cover according to claim 7, wherein,
the lock member is spring biased in a lock side where the first cover and the second cover are supported so as not to be extendable relative to each other.

11. A cutting device having the cover according to claim 7.

* * * * *